Aug. 21, 1934.  E. A. ROSIN  1,970,919
MACHINE FOR CUTTING SHEETS OF GLASS AND THE LIKE
Filed Sept. 21, 1931  15 Sheets-Sheet 1
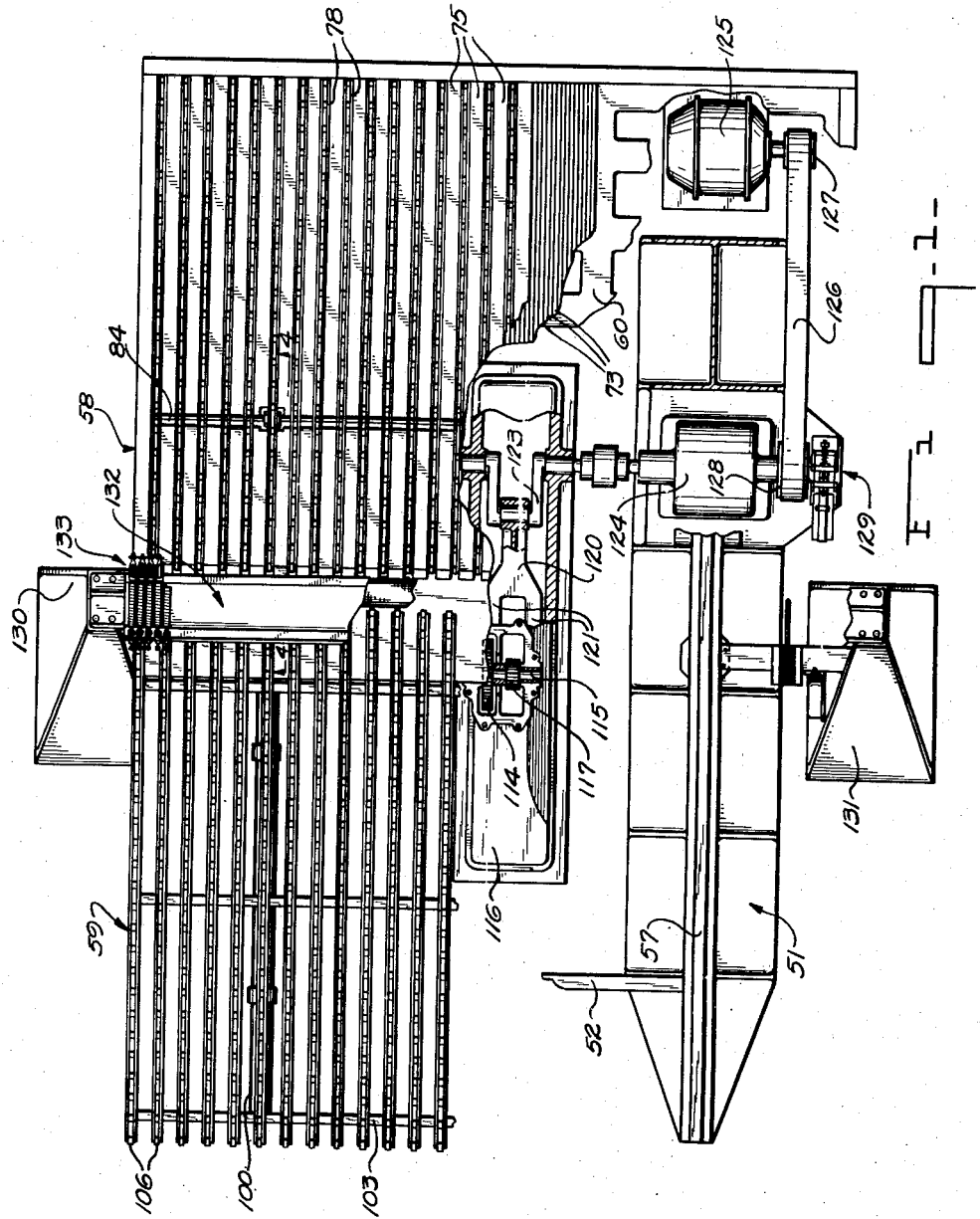
Inventor
EDWIN A. ROSIN.
By Frank Fraser,
Attorney Aug. 21, 1934.   E. A. ROSIN   1,970,919
MACHINE FOR CUTTING SHEETS OF GLASS AND THE LIKE
Filed Sept. 21, 1931   15 Sheets-Sheet 2
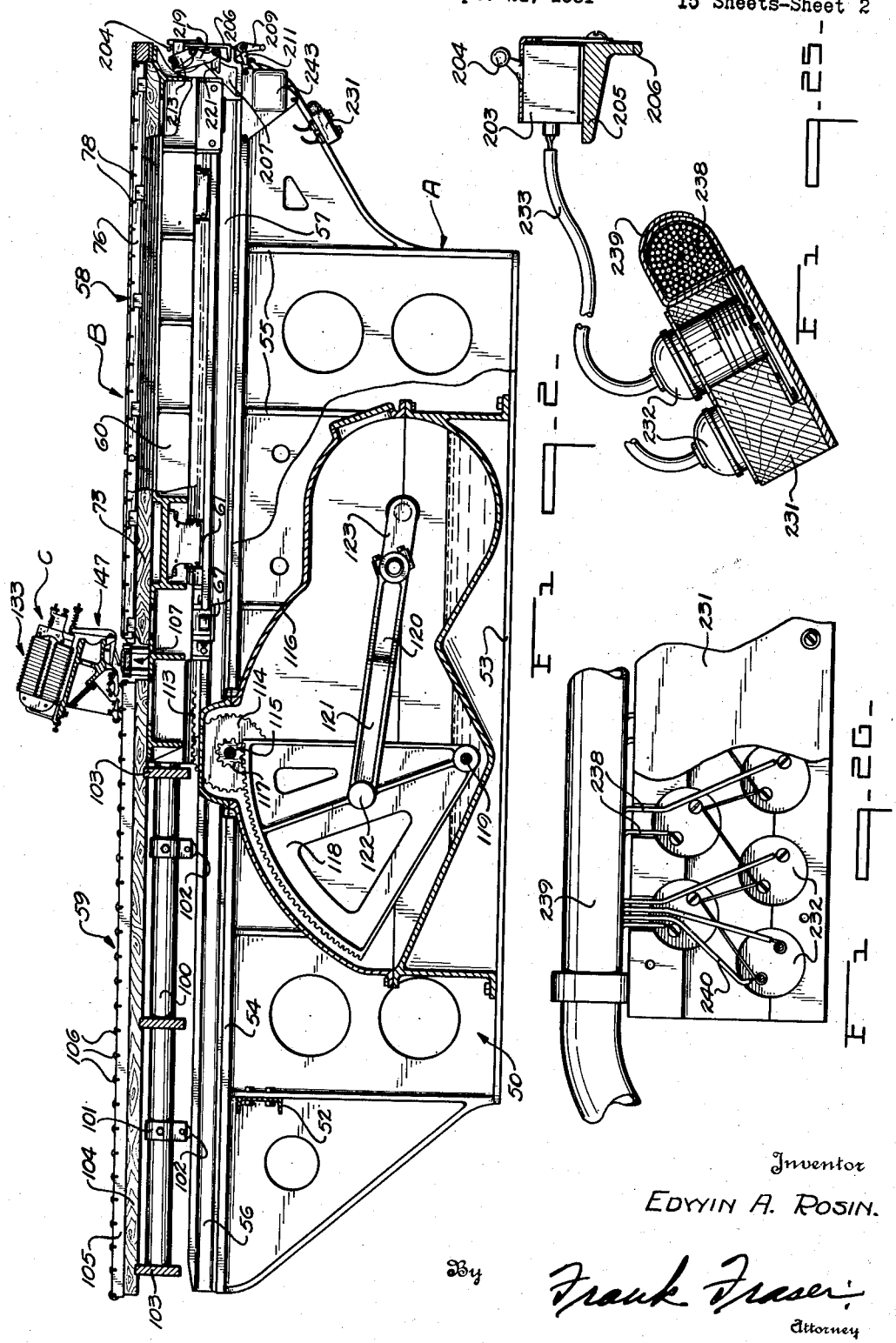
Inventor
EDWIN A. ROSIN.
By Frank Fraser,
Attorney

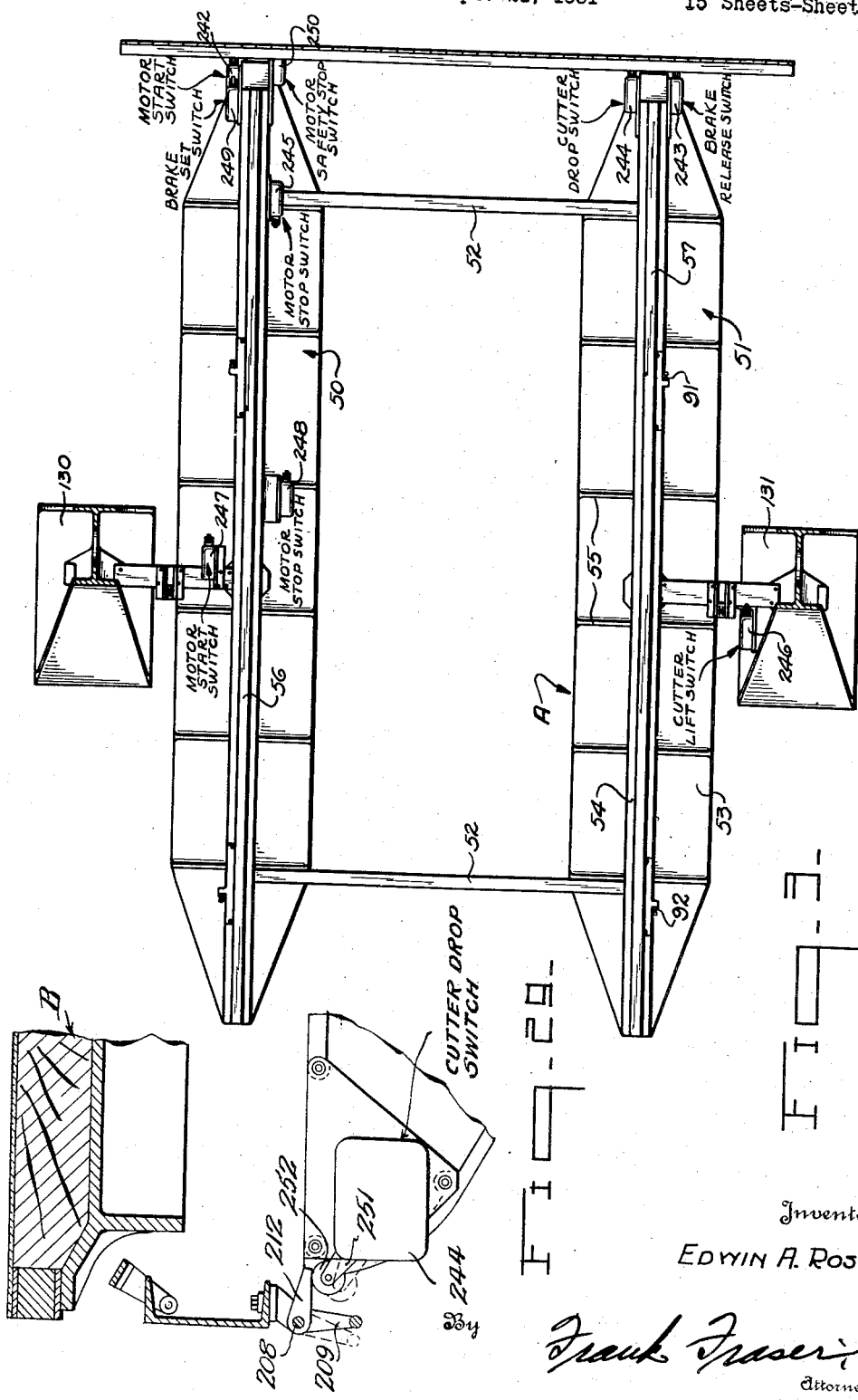

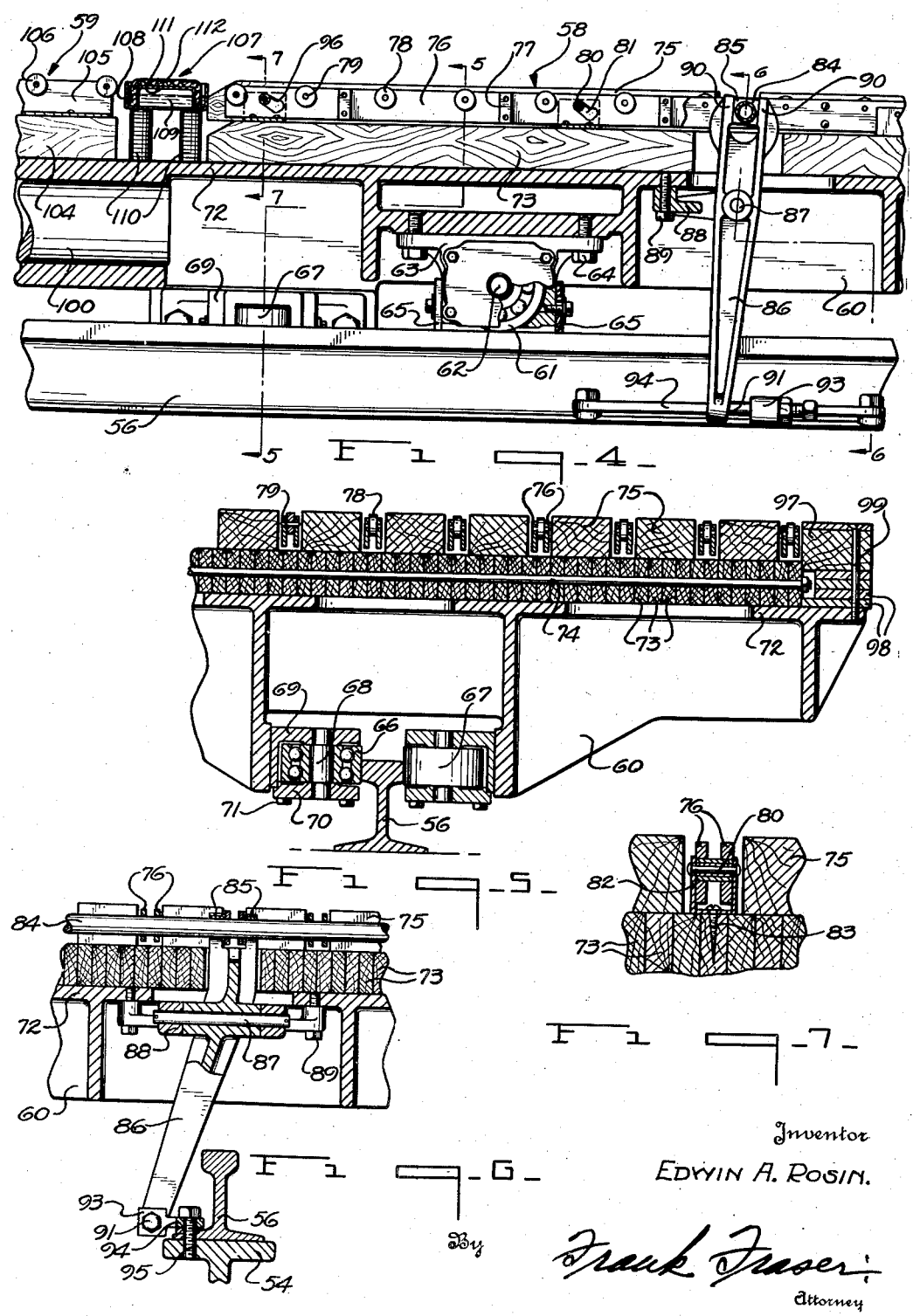

Aug. 21, 1934.  E. A. ROSIN  1,970,919
MACHINE FOR CUTTING SHEETS OF GLASS AND THE LIKE
Filed Sept. 21, 1931  15 Sheets-Sheet 5
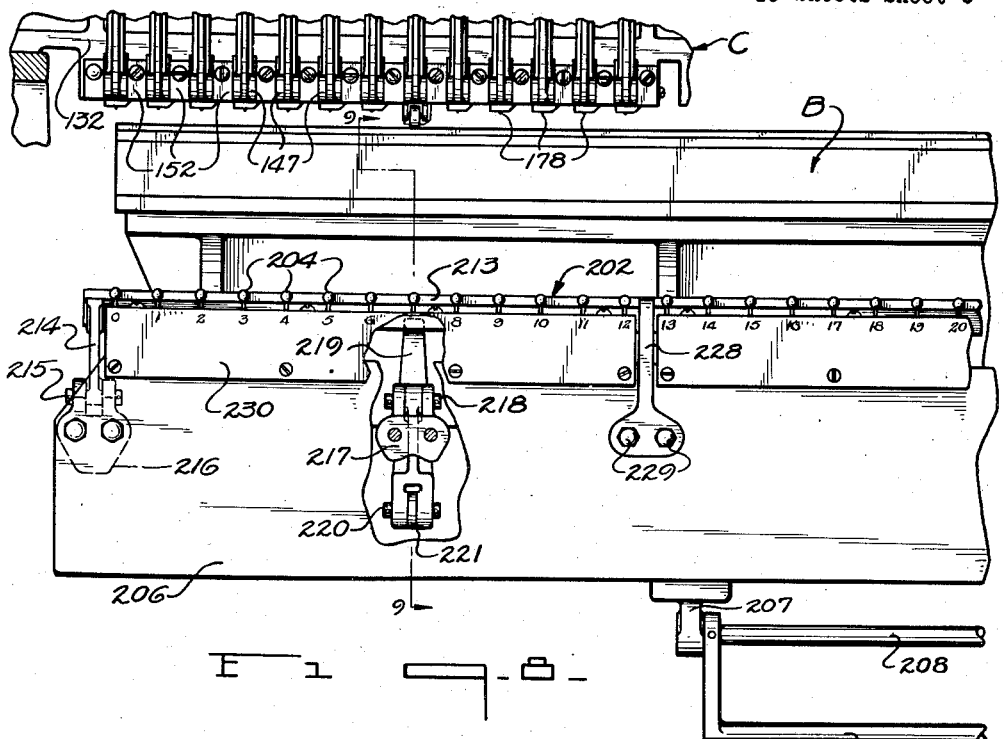
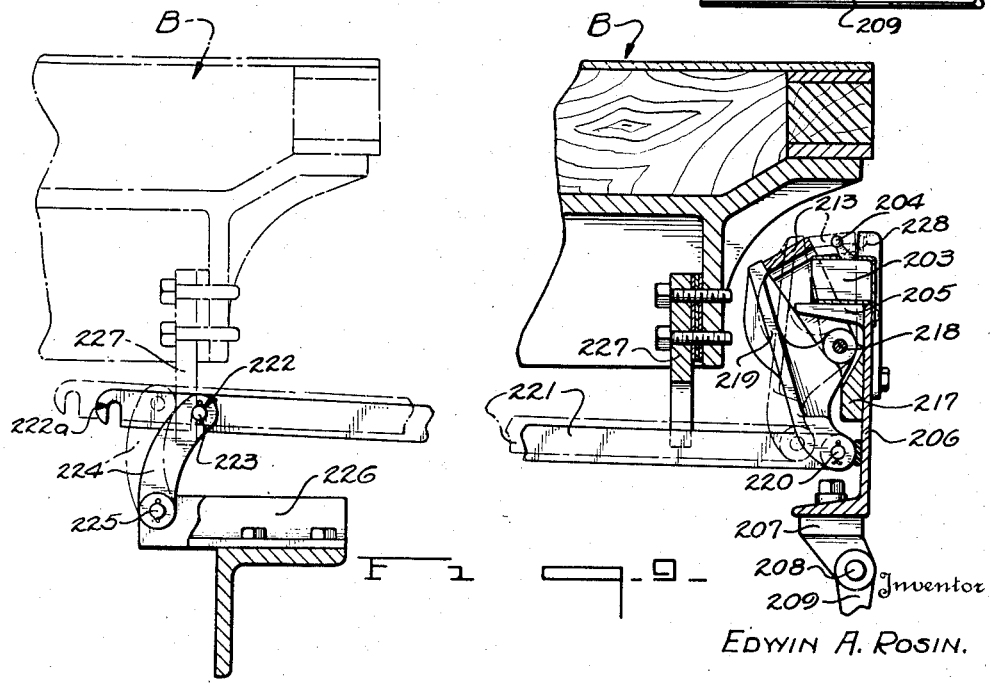
Inventor
EDWIN A. ROSIN.
By Frank Fraser
Attorney Aug. 21, 1934.  E. A. ROSIN  1,970,919
MACHINE FOR CUTTING SHEETS OF GLASS AND THE LIKE
Filed Sept. 21, 1931  15 Sheets-Sheet 6
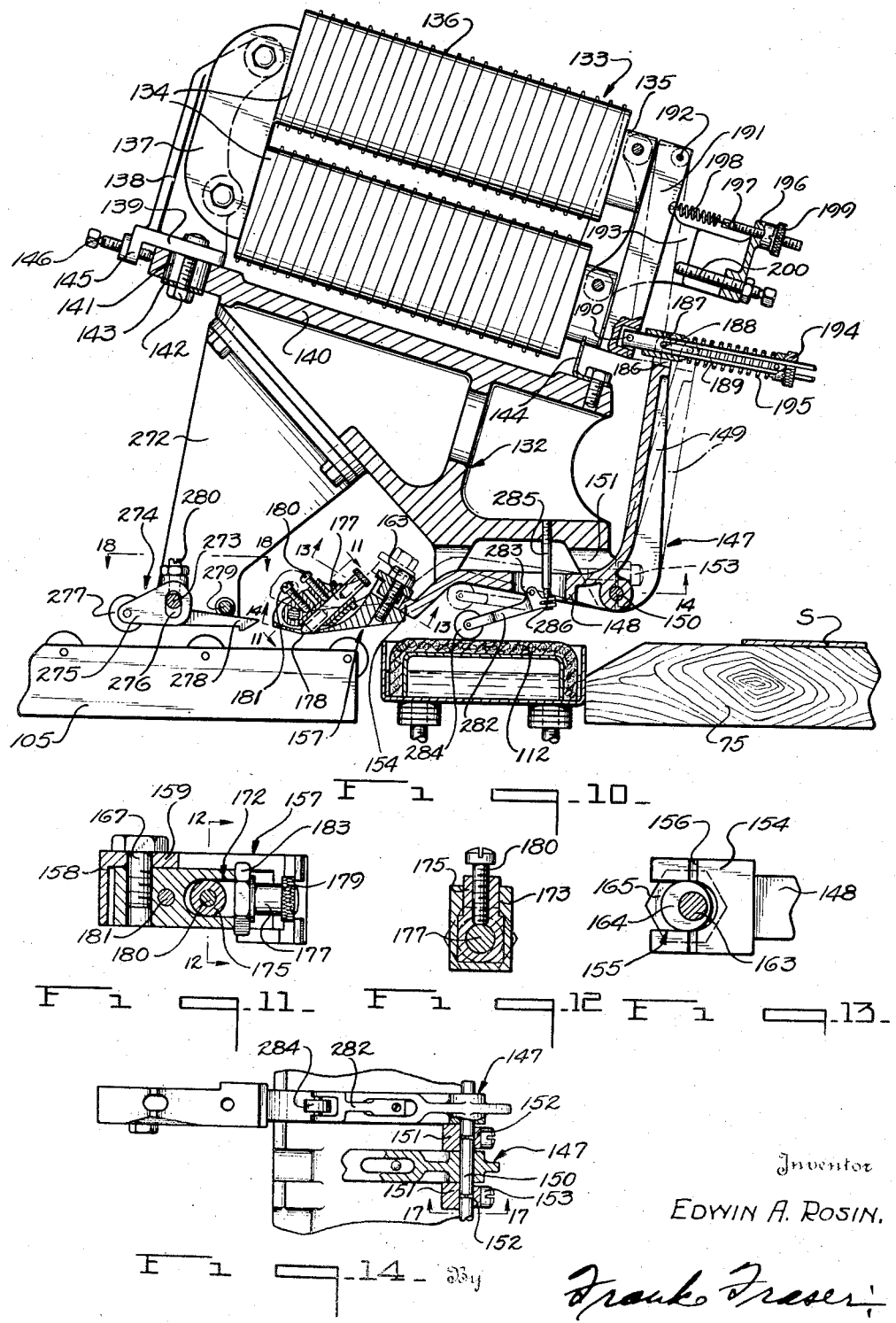
Inventor
EDWIN A. ROSIN.
By Frank Fraser
Attorney Aug. 21, 1934.                    E. A. ROSIN                    1,970,919
                 MACHINE FOR CUTTING SHEETS OF GLASS AND THE LIKE
                        Filed Sept. 21, 1931           15 Sheets-Sheet 7
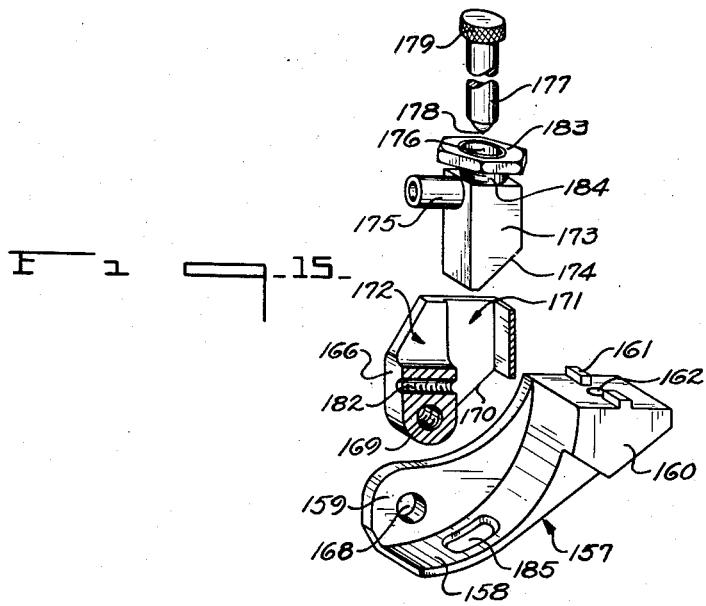
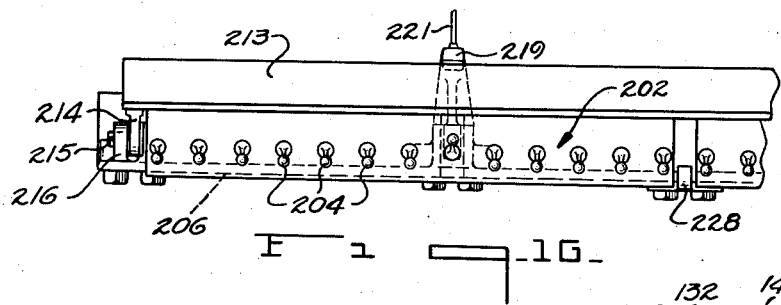
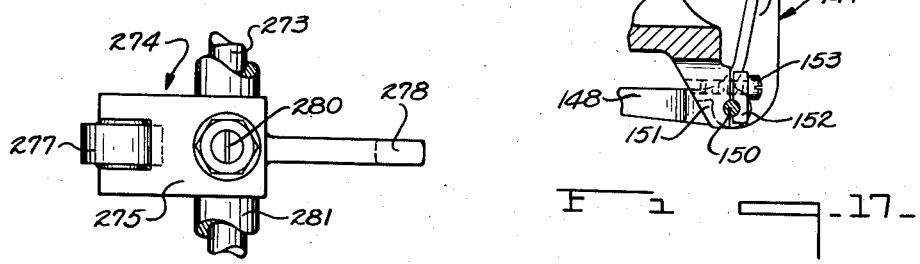
INVENTOR
EDWIN A. ROSIN.
BY
Frank Fraser
ATTORNEY Aug. 21, 1934.  E. A. ROSIN  1,970,919
MACHINE FOR CUTTING SHEETS OF GLASS AND THE LIKE
Filed Sept. 21, 1931   15 Sheets-Sheet 8
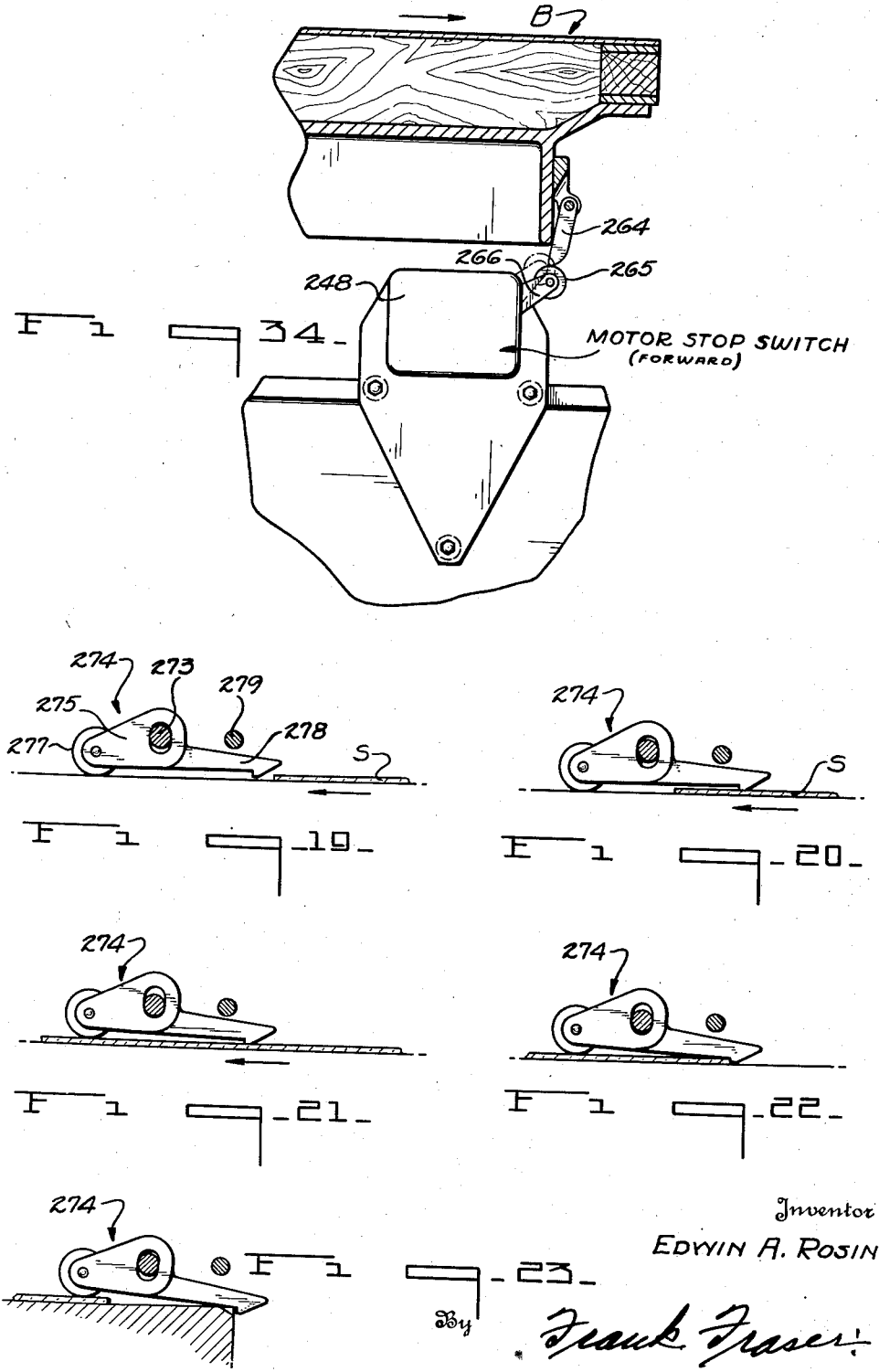
Inventor
EDWIN A. ROSIN.
By Frank Fraser
Attorney Aug. 21, 1934.  E. A. ROSIN  1,970,919
MACHINE FOR CUTTING SHEETS OF GLASS AND THE LIKE
Filed Sept. 21, 1931  15 Sheets-Sheet 9

INVENTOR
EDWIN A. ROSIN
Frank Fraser
ATTORNEY

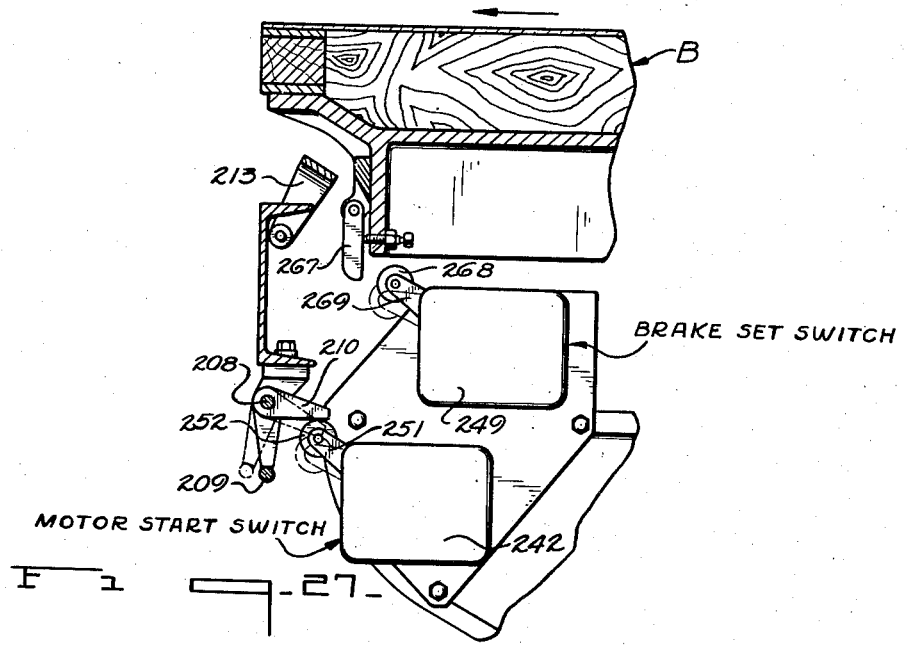
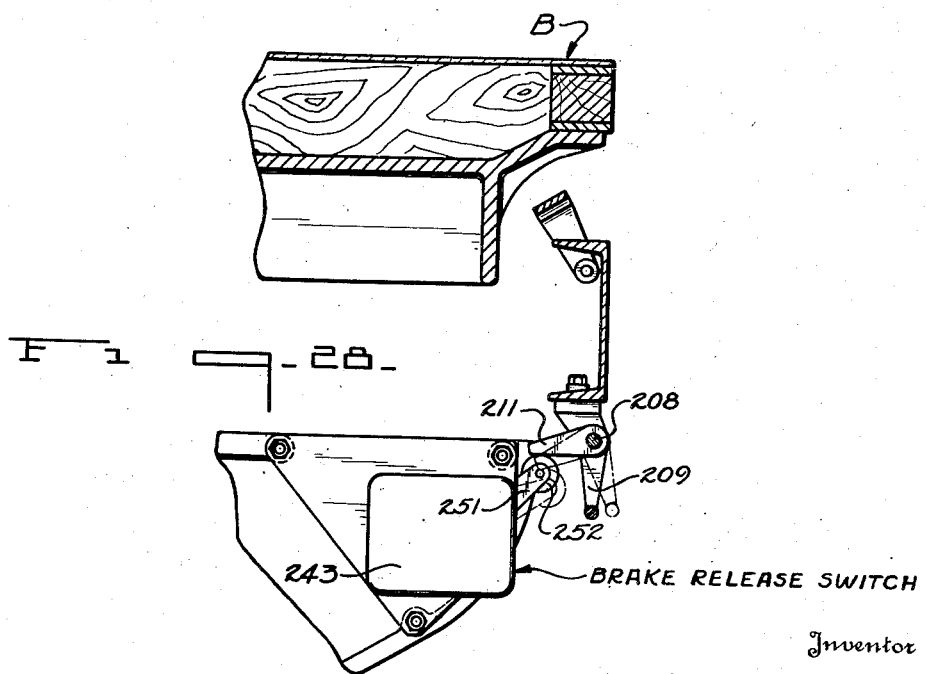

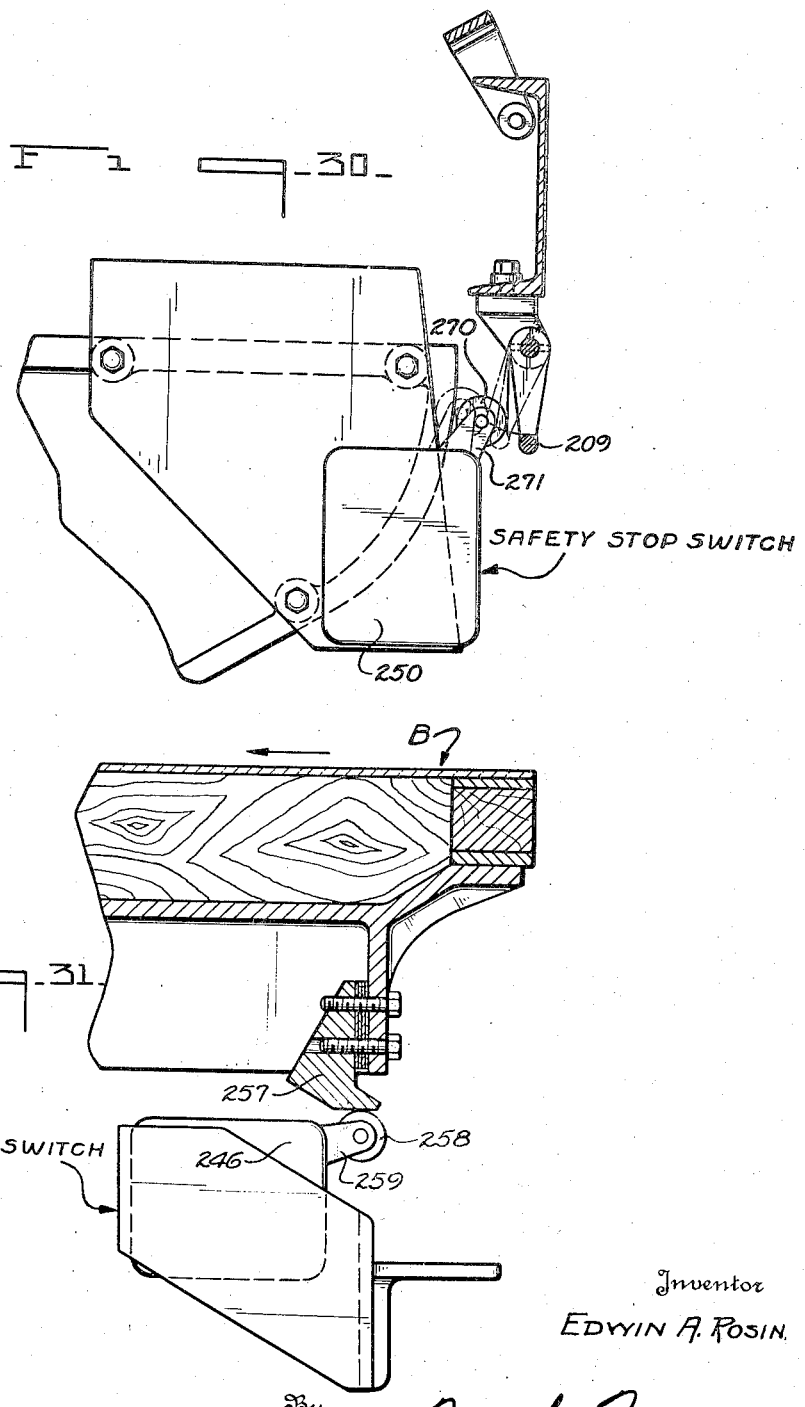

Aug. 21, 1934.  E. A. ROSIN  1,970,919
MACHINE FOR CUTTING SHEETS OF GLASS AND THE LIKE
Filed Sept. 21, 1931  15 Sheets-Sheet 12

Inventor
EDWIN A. ROSIN.
By Frank Fraser
Attorney

Aug. 21, 1934.　　　　　E. A. ROSIN　　　　　1,970,919
MACHINE FOR CUTTING SHEETS OF GLASS AND THE LIKE
Filed Sept. 21, 1931　　　15 Sheets-Sheet 13
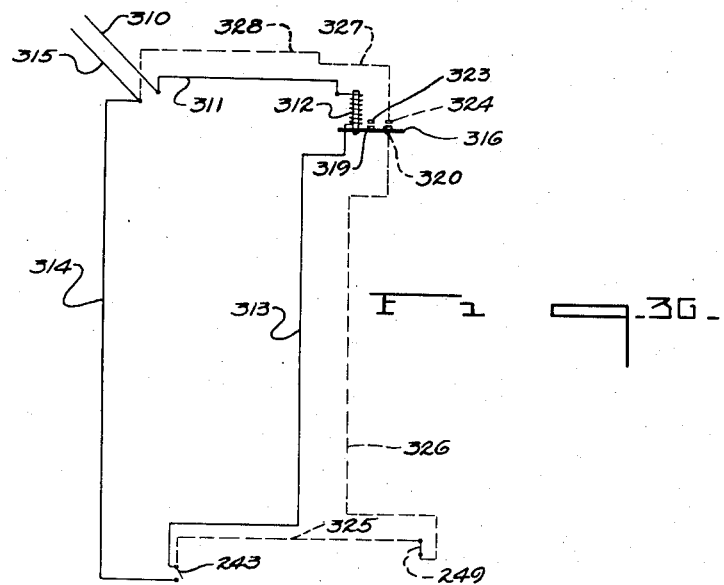
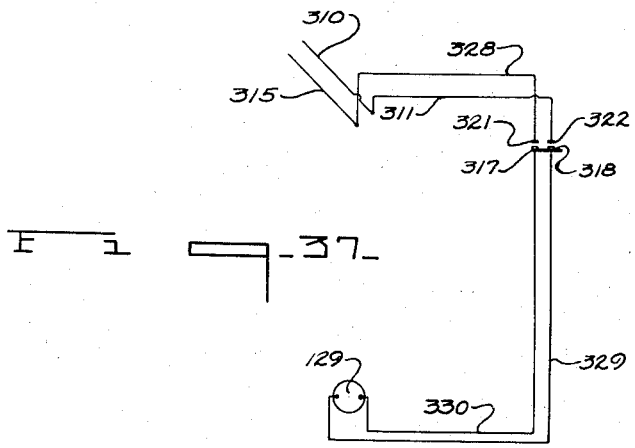
INVENTOR
EDWIN A. ROSIN.
BY
Frank Fraser
ATTORNEY Aug. 21, 1934.  E. A. ROSIN  1,970,919
MACHINE FOR CUTTING SHEETS OF GLASS AND THE LIKE
Filed Sept. 21, 1931   15 Sheets-Sheet 14
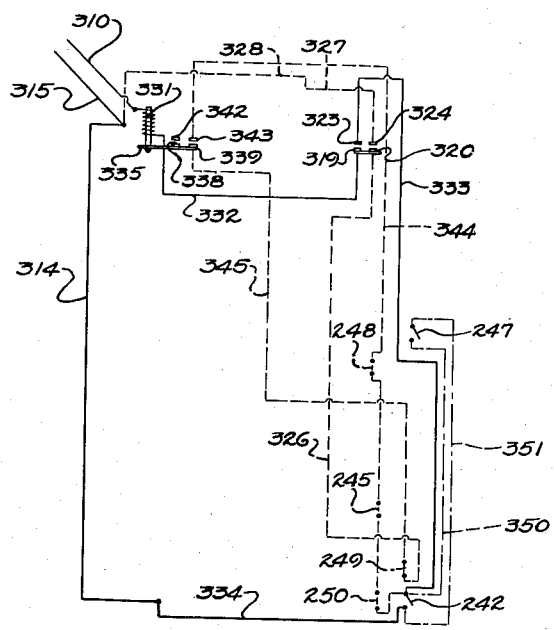
F I G. 38.
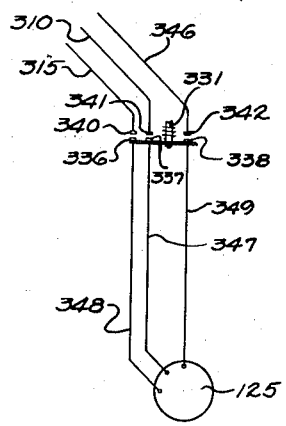
F I G. 39.
INVENTOR
EDWIN A. ROSIN.
BY
Frank Fraser
ATTORNEY

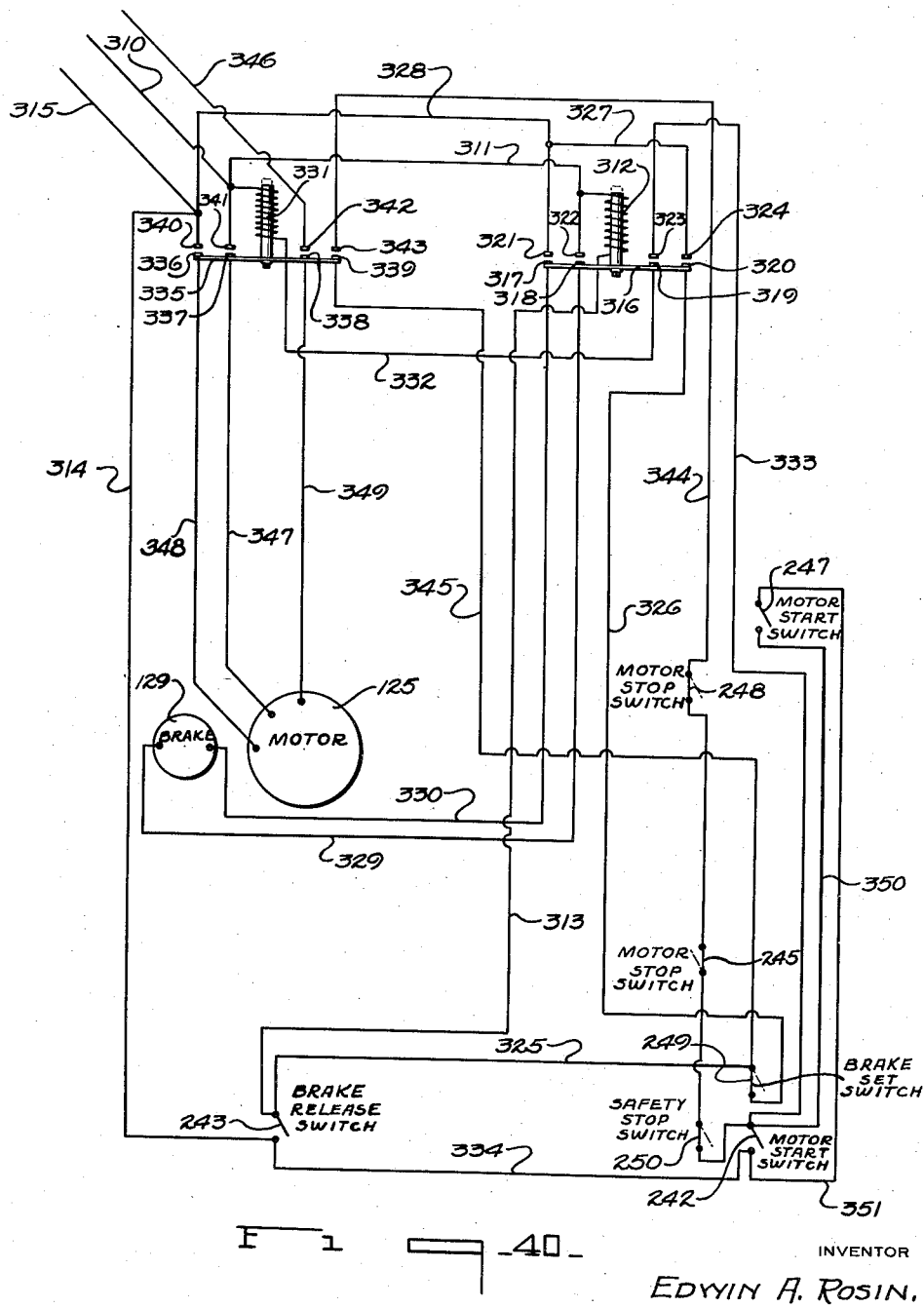

Patented Aug. 21, 1934

1,970,919

UNITED STATES PATENT OFFICE 1,970,919

MACHINE FOR CUTTING SHEETS OF GLASS AND THE LIKE

Edwin A. Rosin, Toledo, Ohio, assignor to Libbey-Owens-Ford Glass Company, Toledo, Ohio, a corporation of Ohio Application September 21, 1931, Serial No. 564,039

21 Claims. (Cl. 33—32)

The present invention relates broadly to cutting apparatus and more particularly to an improved machine for effecting the cutting of glass sheets or plates as required to obtain true edges, effect the elimination of defects, or both.

This invention is primarily designed to do away with the operation of hand cutting as now carried out and wherein it is customary for an operator to place a sheet of glass on a cutting table and, by individual cutting strokes, effect the subdivision thereof into pieces of desired sizes having regard to the shape of the glass and the defects therein. This hand cutting is not only very expensive, demanding highly skilled labor, but also gives a relatively large percentage of breakage and waste from imperfect cutting or accidental moving of the straight edge. The present invention is designed to overcome these defects and to greatly reduce the cost of the cutting operation.

The principal object and aim of this invention is the provision of a glass cutting machine adapted to effect either a single cutting operation or a plurality of cutting operations simultaneously, whereby the time required for cutting up a sheet of glass is materially reduced and the effort on the part of the operator correspondingly lessened.

Another object of the invention is the provision of a cutting machine of the character above described embodying various novel and improved features of construction, arrangement and operation, all of which will be more fully hereinafter described.

In the drawings forming a part of this application and wherein like numerals are employed to designate like parts throughout the same, Fig. 1 is a plan view, partially broken away, of a cutting machine constructed in accordance with the present invention, Fig. 2 is a vertical longitudinal section therethrough, Fig. 3 is a plan view of the base or sub-structure, with the work-carrying table and cutting mechanism removed, Fig. 4 is a longitudinal section taken substantially on line 4—4 of Fig. 1, Fig. 5 is a vertical section taken substantially on line 5—5 of Fig. 4.

Fig. 6 is a vertical section taken substantially on line 6—6 of Fig. 4,

Fig. 7 is a vertical section taken substantially on line 7—7 of Fig. 4,

Fig. 8 is a front elevation of a portion of the machine, partially broken away,

Fig. 9 is a section taken substantially on line 9—9 of Fig. 8,

Fig. 10 is a vertical longitudinal section through one of the cutting units,

Fig. 11 is a section taken substantially on line 11—11 of Fig. 10,

Fig. 12 is a section taken substantially on line 12—12 of Fig. 11,

Fig. 13 is a section taken substantially on line 13—13 of Fig. 10,

Fig. 14 is a section taken substantially on line 14—14 of Fig. 10,

Fig. 15 is a perspective view, partially in section, of one of the cutter holder assemblies, Fig. 16 is a plan view of a portion of the switchboard provided for controlling the cutters, Fig. 17 is a section taken substantially on line 17—17 of Fig. 14.

Fig. 18 is a plan view taken on lines 18—18 of Fig. 10,

Figure 24:
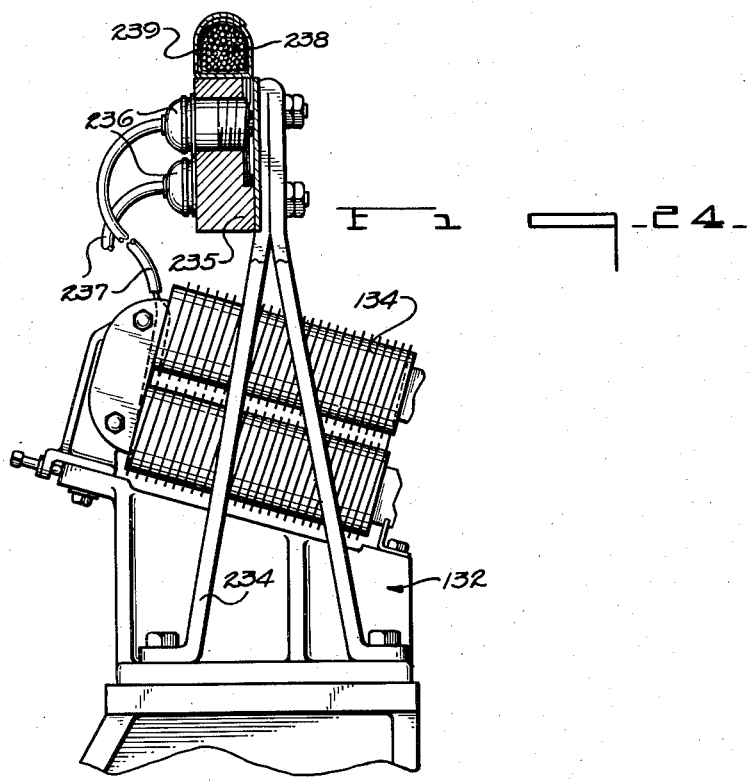
Figure 35:
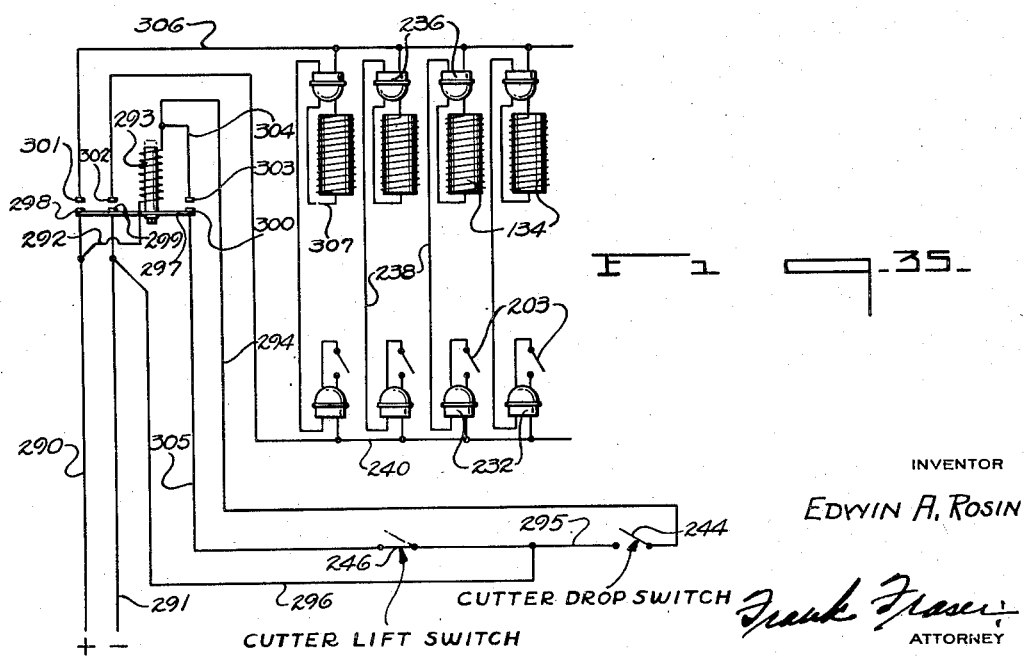
Figure 32:
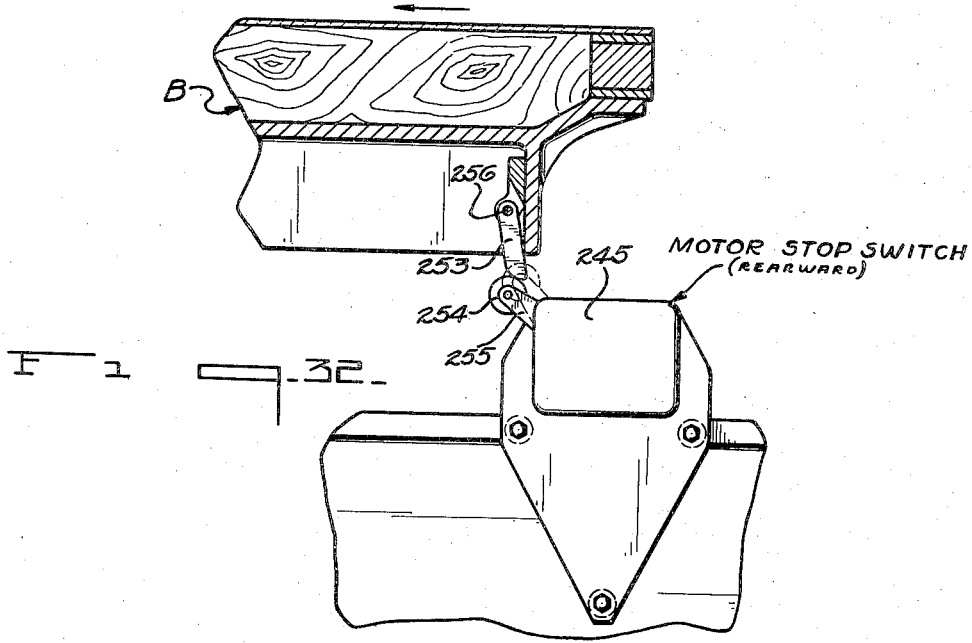
Figure 33:
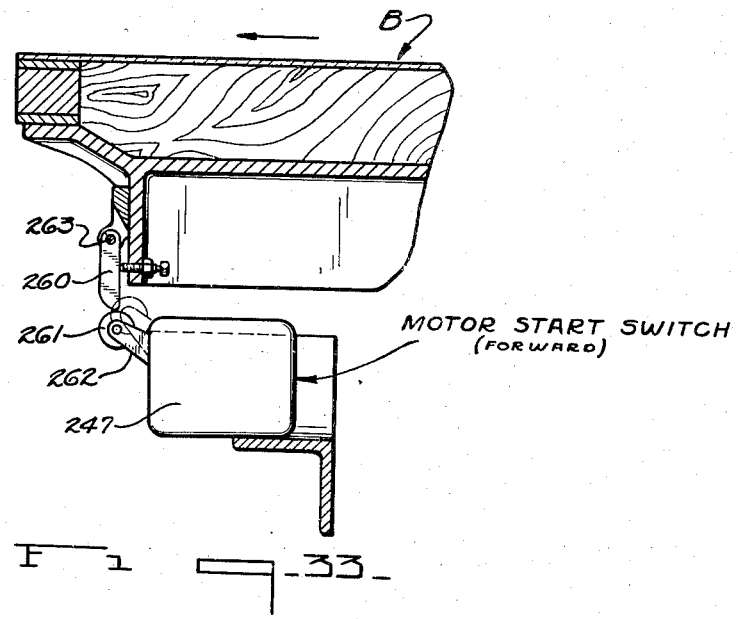

Figs. 19 to 23 inclusive are views showing the construction and operation of the hook members which are provided for effecting transfer of the sheets subsequent to cutting from the cutting section of the table to the receiving section thereof, Fig. 24 is a detail view of a portion of the cutting mechanism showing the means for supplying electric current to the electro-magnets, Fig. 25 is a detail view of the switchboard and the electrical connections therefor, Fig. 26 is a detail view of a portion of the electrical connections, Figs. 27 to 34 inclusive are views showing the arrangement and operation of the several switches employed to effect the necessary control of the various parts of the machine, Fig. 35 is a wiring diagram of the electrical control of the cutting mechanism, Fig. 36 is a wiring diagram of the brake actuating and brake holding circuits, Fig. 37 is a wiring diagram of the brake operating circuit, Fig. 38 is a wiring diagram of the motor actuating and motor holding circuits, Fig. 39 is a wiring diagram of the motor operating circuit, and Fig. 40 is a composite wiring diagram of the various circuits shown in Figs. 36 to 39.

Referring now to the drawings, and particularly with reference first to Figs. 1 to 7 inclusive, the cutting machine illustrated therein may be said to consist generally of three principal parts or units, namely, the supporting base or sub-structure A, the table B movably carried upon said base, and the cutting mechanism C mounted above the table, said cutting mechanism C being stationary, and the table B, which is adapted to support the glass sheets to be cut, being movable back and forth therebeneath.

The base A of the machine consists of the two longitudinally extending vertical side members 50 and 51 which are preferably in the form of castings arranged in parallelism with respect to one another and being connected together adjacent their opposite ends and also intermediate their ends if desired, by a suitable number of cross beams 52. Each side member 50 and 51 is formed with a relatively wide supporting base plate 53 and a relatively narrower top plate 54 connected by vertical strengthening ribs 55. Carried by the top plates 54 of side members 50 and 51 are the rails 56 and 57 respectively which movably support the table B thereupon.

The table B is divided longitudinally into two principal parts or sections 58 and 59, the former constituting the cutting section upon which the sheets are supported during cutting, and the latter serving as a receiving section for receiving the glass from the cutting section after the cutting thereof as will be more fully hereinafter apparent.

The cutting section 58 of the table B consists of a main substantially rectangular casting 60 mounted at its opposite sides and also adjacent each end thereof upon wheels 61 which are supported upon and run along the rails 56 and 57, each wheel 61 being carried upon a shaft 62 journaled within a bearing bracket 63 secured to casting 60 by bolts or the like 64. Preferably carried by the bearing brackets 63 are wiping strips 65 of felt or the like which engage the upper surfaces of the rails 56 and 57 and serve to keep them clean and free from foreign matter.

In order to prevent any lateral vibratory movement of the table B, there may be provided at one side of the said table a suitable number of pairs of rollers 66 and 67 which engage opposite sides of the corresponding rail 56 or 57. Each roller is mounted upon a vertical pin 68 received at its upper end within a housing 69 and at its lower end within a plate 70. The housing 69, which fits over the roller, is carried by the casting 60, while the plate 70 is secured to said housing by bolts or the like 71.

The main table casting 60 is provided with a flat horizontal top 72 upon which is carried a series of wooden strips 73 extending longitudinally of the table. These wooden strips are stood on edge and are positioned to abut one another, being secured together by a plurality of spaced transverse tie rods 74. The strips 73 form, in effect, a substantially solid wooden bed upon which is supported a plurality of longitudinally extending transversely spaced wooden beams 75. Positioned within the space between any two adjacent beams 75 is a pair of spaced longitudinally extending metal strips 76 secured together and at the same time held spaced from one another by a series of spaced blocks 77 (Fig. 4.) Arranged between and carried by the metal strips 76 of each pair are a plurality of relatively small rollers 78 mounted upon pins 79, and which rollers project above the upper edges of said strips. The said strips 76 of each pair are supported at opposite ends and also intermediate their ends, if desired, upon transverse roller pins 80 which extend through inclined bayonet slots 81 in the strips and are supported by the U-shaped members 82 secured to the wooden bed by fastening elements 83 (Fig. 7).

Extending transversely through all of the pairs of strips 76 at a point substantially intermediate the ends of table section 58 is a shaft 84, and carried by this shaft adjacent each side of the table are the substantially square blocks 85. The numeral 86 designates a substantially vertically disposed rocker arm pivotally mounted intermediate its ends upon a pin 87, said pin being supported at its opposite ends within the spaced portions of a substantially U-shaped bracket 88 secured to the main table casting 60 by fastening elements 89. The upper end of the rocker arm 86 is slotted to receive the metal strips 76 (Fig. 6) and is also bifurcated (Fig. 4) to provide spaced parallel legs 90 which straddle the square blocks 85.

Positioned adjacent the front end of the machine is a stop member 91 against which the lower end of the rocker arm 86 is adapted to abut upon forward movement of the table, while a similar stop member 92 (Fig. 3) is provided adjacent the rear end of the machine and against which the lower end of the said rocker arm is adapted to abut upon rearward movement of the table. Each stop member 91 and 92 consists of a horizontal bolt threaded through a lug 93 carried intermediate the ends of a horizontal plate 94 secured in place by fastening elements 95 which pass through the base of the respective rail 56 or 57 and the top plate 54 of the side member 50 or 51.

With such an arrangement as described above, it will be apparent that as the table B moves forwardly and the lower ends of the rocker arms 86 engage stop bolts 91, the upper ends of said rocker arms will be swung upon pins 87 to the right (Fig. 4) which will move all of the metal strips 76 forwardly. When this is done, the roller pins 80 will move into the upper ends of bayonet slots 81 and thereby permit the rollers 78 to be lowered beneath the upper surfaces of wooden beams 75. However, when the table is moved rearwardly and the lower ends of rocker arms 86 engage stop bolts 92, the upper ends of said rocker arms will be swung to the left, thereby moving all of the strips 76 to the left and, when this is done, the roller pins 80 will be moved into the lower portions of the bayonet slots 81, permitting the rollers 78 to be raised upwardly so as to project above the level of beams 75. During this raising and lowering of the rollers 78, there will of course be a certain amount of sliding action between the legs 90 formed at the upper ends of rocker arms 86 and the square blocks 85 carried by shaft 84. Due to the particular formation of the bayonet slots 81 as shown in Fig. 4, the rollers 78 will be held in their elevated position by engagement of the roller pins 80 within the offset portions 96 of the slots until lowered by engagement of rocker arms 86 with stop bolts 91. Carried along each longitudinal side edge of the cutting section 58 of the table is a beam 97 supported upon a plurality of boards 98 and secured to top 72 of casting 60 by fastening elements 99.

The receiving section 59 of table B includes a pair of spaced longitudinally extending parallel shafts 100, one being positioned above each of the rails 56 and 57. Each of these shafts is secured at its inner end to the main table casting 60 and has mounted thereon a plurality of clamps 101 carrying wheels 102 which run upon the said rails. The shafts 100 at opposite sides of the table are connected together at their opposite ends and also intermediate their ends, if desired, by a plurality of cross members 103. Supported upon these cross members 103 are a plurality of longitudinally extending transversely spaced wooden strips 104, each carrying a U-shaped channel member 105, which in turn carries a series of freely rotatable rollers 106 similar to the rollers 78 of cutting section 58. The rollers 106 are not adjustable vertically, but are on the contrary maintained in the same vertical position at all times. When the rollers 78 of cutting section 58 are in their lowered position, they are arranged slightly beneath the level of rollers 106, whereas when in their elevated position, they are in substantial horizontal alignment therewith.

In order to facilitate the cutting operation and better the action of the cutting tools, it is desirable to oil the glass sheets or plates along the path to be traveled by the cutting tools. To this end, there is mounted upon the top of the table B between the adjacent ends of the wooden strips 73 and 104 which are spaced from one another, (Figs. 2 and 4) an oiling device designated in its entirety by the numeral 107 and comprising a reservoir 108 adapted to contain a quantity of oil 109 and being supported upon a plurality of shims 110. The oiling device also includes a substantially inverted U-shaped member 111 covered with a wick 112 of suitable material such as felt or the like, the downturned edges of said wick being immersed within the oil. With such an arrangement, the oil will pass upwardly by capillary attraction into and through the wick 112.

The means for effecting the desired reciprocating movement of the sheet supporting table B along the rails 56 and 57 may be as follows: Carried by the underside of the main table casting 60 is a longitudinally extending rack bar 113, and adapted to mesh therewith is a drive pinion 114 keyed to a transverse shaft 115 mounted in the opposite side walls of a housing 116 which serves to enclose the driving means. Also keyed upon shaft 115 is a spur gear 117 meshing with the toothed segment 118 pivotally mounted at its lower end upon a shaft or pin 119. Secured to the segment intermediate its upper and lower ends is a pitman rod 120, the forward end thereof being bifurcated to provide spaced legs 121 which straddle the segment and are pivotally connected thereto as at 122. The opposite end of the pitman rod has a pivotal mounting with the crank 123 also rotatably mounted within the side walls of housing 116. This crank 123 is driven through suitable reduction gearing located in gear case 124 from a motor 125, the driving being effected by means of a belt 126 trained about a pulley 127 on the motor shaft and also about a pulley 128 upon a shaft associated with the speed reduction gearing.

A magnetic brake 129 of any well known or preferred construction is associated with the speed reduction gearing in gear case 124 in a manner to stop the rotation of the crank 123 and consequently the reciprocating movement of the table at the desired time. As the crank 123 is rotated, the sector gear 118 will be reciprocated about its pivot 119 in such a manner as to effect movement of the table B backward and forward. The driving means is preferably so timed that one complete revolution of the crank 23 will cause one complete backward and forward stroke of the table.

The cutting mechanism C embodies a pair of vertical stationary standards 130 and 131 located at opposite sides of the machine and having secured to the upper ends thereof a cross member or beam 132, said beam being arranged above the table B and supporting a series of cutting units arranged side by side transversely of the table, each unit being designated in its entirety by the numeral 133, with the cutters being preferably, although not necessarily, spaced about one inch apart.

Referring now more particularly to Figs. 10 to 15, it will be seen that each cutting unit 133 includes a pair of relatively thin electro-magnets 134 positioned one above the other and each consisting of a metal core 135 about which is wound the usual coil 136. The cores 135 for each pair of magnets are connected together at their rear ends by a member 137, to which is secured a bracket 138, said bracket being provided with a base 139 which is adapted to rest upon the inclined portion 140 of cross beam 132. This inclined portion has an opening 141 therein, and projecting upwardly through this opening is a bolt 142 threaded within the base 139 of bracket 138, a washer 143 bearing against the underside of inclined portion 140. By this means, the electro-magnets are rigidly secured to the cross beam, the forward ends of the said magnets being supported upon plates 144. In order to effect proper positioning of the electro-magnets and also to prevent slipping thereof, the bracket 138 may be provided with an offset ear 145, through which passes an adjusting screw 146 engaging the rear edge of inclined portion 140 of the cross beam. By loosening the bolt 142 and adjusting screw 146, the proper positioning of the electro-magnets can be effected.

Each of the cutting units 133 also includes a substantially L-shaped lever 147 comprising a substantially horizontal tool supporting arm 148 and a substantially vertical arm 149, said lever being pivotally mounted intermediate its ends upon a horizontal pin 150. As best shown in Figs. 14 and 17, the L-shaped lever 147 of each cutting unit is carried upon an individual pin 150, said pin projecting beyond the lever at opposite sides thereof. The cross beam 132 is provided with a plurality of spaced depending ears 151, one of said ears being positioned between each pair of adjacent levers 147 and constituting one-half of a bearing for the respective pin 150. A plate 152 constitutes the other half of the bearing, being secured to the respective ear by a screw or other fastening element 153. This construction is provided in order that any one of the levers 147 may be removed from the machine without disturbing the position or operation of the remaining levers. For instance, when it is desired to remove any one lever, it is simply necessary to remove the plates 152 at opposite sides of the said lever, whereupon the lever can be removed, after which the plates 152 are again secured in place.

The horizontal arm 148 of lever 147 is provided with an offset foot 154 formed with an open slot 155 and having grooves 156 upon the lower face thereof. Carried by the offset foot is a shoe 157 comprising an arcuately curved bottom plate or supporting portion 158 and a substantially vertically disposed flange 159 at one side edge thereof. The upper end of the shoe 157 is formed with a head 160 having formed upon the flat upper surface thereof ribs 161 which fit within the grooves 156 in the offset foot 154. The body portion of the shoe also has a threaded opening 162 adapted to receive therein the securing element 163. This securing element is in the form of an ordinary bolt, and carried thereby and received within the slot 155 in foot 154 is an eccentric 164 formed with a wrench engaging head 165 so that it can be readily turned. With such a construction, it will be apparent that upon loosening the bolt 163 and rotating the eccentric 164, the shoe 157 can be adjusted transversely with respect to the foot 154, the ribs 161 fitting within slots 156 serving to prevent any rotation of the said shoe.

Adapted to be supported upon the arcuately curved bottom plate 158 of shoe 157 is a member 166 pivotally secured to the said shoe by means of a bolt 167 passing loosely through the opening 168 in flange 159 and threaded within the opening 169 in member 166. The bottom of the member 166 is beveled as at 170, and extending vertically through the said member is a substantially square opening 171. The member 166 is also formed with a cut-out portion or recess 172 communicating with the opening 171. Adapted to be received within the opening 171 is a cutter holder 173, the bottom of which is likewise beveled as at 174. The cutter holder 173 is also provided with a forwardly disposed stem 175, and when the cutter holder is inserted within the opening 171, this stem is received within recess 172. The cutter holder is provided with a vertical opening 176 and the stem 175 is also formed with an opening communicating with the opening 176.

Adapted to be received within the opening 176 in cutter holder 173 is the cutter 177 carrying at its lower end a cutting diamond 178 and its upper end being formed with a knurled head 179, if desired, to facilitate turning of the cutter within the opening 176 to adjust the position of the diamond. The cutter 177 is secured within the holder 173 by means of a set screw 180 passing through the stem 175 while the holder 173 is secured within the opening 171 by a set screw 181 passing through opening 182 in member 166. The holder 173 is supported within the member 166 by means of a nut 183 threaded upon the upper cylindrical end 184 of holder 173, said nut resting upon the top of member 166. Upon loosening of the set screw 180, the cutter 177 can be rotated within opening 176 to facilitate proper positioning of the cutting diamond. Likewise, upon loosening of set screw 181 and rotation of nut 183, the cutter holder 173 can be moved upwardly or downwardly within opening 171 to adjust the vertical position of the cutter. When the above parts are in properly assembled position, the cutter 178 is adapted to project downwardly through the slot 185 in the bottom plate 158 of shoe 157.

The upper end of the vertical arm 149 of each lever 147 is bifurcated to provide spaced ears 186 which straddle a sleeve 187, being pivotally secured thereto by a pin 188. The sleeve 187 is slidably mounted upon a split bolt 189 pivoted at its inner end as at 190 to a metal bar 191, which in turn has a pivotal mounting at its upper end as at 192 with a bracket 193 fixedly carried by the cores 135 of the electro-magnets. Threaded upon the outer end of the split bolt 189 is a nut 194, and encircling the bolt and bearing at one end against the sleeve 187 and at its opposite end against the nut 194 is a compression spring 195 normally tending to urge the sleeve 187 and consequently the upper end of the lever arm 149 inwardly. The pin 188 of course passes loosely through the slot in the bolt 189.

Loosely received through the portion 196 of bracket 193 is a bolt 197 having secured to its inner end a tension spring 198, the opposite end of said spring being connected to the bar 191 and acting to normally draw the said bar away from and out of engagement with the cores of the electro-magnets as indicated by the broken lines in Fig. 10. A nut 199 is threaded upon the outer end of bolt 197 to adjust the tension of spring 198. Also carried by the portion 196 of bracket 193 is a stop bolt 200 which engages bar 191 and serves to limit the outward movement thereof about its pivot 192. In practice, when the electro-magnets 134 are energized, the bar 191 will be drawn inwardly thereby against the action of spring 198, and of course the inward movement of bar 191 will cause the lever 147 to be rocked in a counter-clockwise direction upon pin 150, which will effect a lowering of the cutter 178 into cutting position. However, upon de-energization of the electro-magnets, the spring 198 will function to swing the bar 191 outwardly so as to rock the lever 147 in a clockwise direction to return the cutter 178 to a non-cutting position. The spring 195 serves to yieldably maintain the cutter in engagement with the glass during the cutting operation, while at the same time allowing a limited amount of rocking movement of the lever 147 to take care of any unevenness in the glass surface. In other words, the lever 147 is permitted a slight rocking movement even when the bar 191 is held inwardly by the electro-magnets.

Supported beneath the top of the table B at the forward end of the machine and within convenient reach of the operator is a switchboard 202 extending transversely of the table and including a plurality of conventional spring snap switches 203, one being provided for each of the cutters and being connected in series with the corresponding pair of electro-magnets 134, each switch including the usual key or finger-piece 204. The switches 203 are supported upon the horizontal portion 205 of a channel member 206 carried by brackets 207 (Fig. 2) secured to the side members 50 and 51 of the supporting frame A.

Carried at the bottom of the channel member 206 adjacent each side of the machine is a depending bracket 207, and extending between and carried by these brackets is a shaft 208 having mounted thereupon a substantially U-shaped operating rod 209 by means of which the said shaft may be oscillated. Carried by the shaft 208 at spaced locations longitudinally thereof are the three actuating fingers 210, 211 and 212 shown in Figs. 27, 28 and 29 respectively, the purpose of which will be more fully hereinafter described.

The individual switches 203 comprising the switchboard 202 are adapted to be manually closed by the operator at the beginning of the cutting operation, the switches closed being dependent upon which cutters it is desired to employ in the cutting operation. However, after the cutting operation has been completed, the switches are preferably automatically opened by the table B when it reaches the end of its cutting stroke. The means for automatically opening the switches at the proper time may include a horizontal knock-out bar 213 positioned at the rear of the switchboard and supported at its opposite ends and also intermediate its ends if desired by arms 214 pivotally mounted as at 215 to brackets 216 carried by the channel member 206.

Also secured to the channel member 206 adjacent each side of the machine is a bracket 217, and pivotally connected thereto as at 218 is a lever arm 219, the upper end of the lever arm being adapted to engage the knock-out bar 213 and move the same forwardly to open the switches 203. Pivotally connected to the lower end of the lever arm 219 as at 220 is one end of a rod 221 which extends longitudinally of the machine and is provided adjacent its rear end with a notch 222 adapted to receive therein a pin 223 carried by link 224 pivoted at 225 to a bracket 226 fixed to the supporting frame of the machine. When the table B reaches the end of its rearward cutting movement, the lower end of the depending plate 227 carried at the forward end thereof is adapted to engage pin 222 and move the bar 221 rearwardly, thereby swinging the lever arm 219 about its pivot 218 and moving the knock-out bar 213 forwardly to engage the switch keys 204 and urge them forwardly so as to open all of the individual switches which may have been previously closed. This is best illustrated in Fig. 9.

The forward movement of the knock-out bar 213 is limited by means of a plurality of stop members 228 secured to the channel member 206 by fastening elements 229 and projecting upwardly between two adjacent switches. Also secured to the front of the channel member 206 are plates 230 bearing numbers corresponding to the number of the individual switches 203.

Each of the individual switches 203 constituting the switchboard 202 may be connected with its corresponding pair of electro-magnets in the following manner: Thus, upon reference particularly to Figs. 24, 25 and 26, there is secured at the front of the machine a plate 231 carrying a plurality of conventional two-part electrical connectors 232, one being provided for each switch 203 and being electrically connected therewith by wires contained within the cable 233. Extending between and supported by two upstanding brackets 234 mounted upon the cross beam 132 is a similar plate 235 carrying a plurality of electrical connectors 236, one being provided for each pair of electro-magnets 134 and electrically connected therewith by wires contained within cable 237. The connectors 232 are connected with the corresponding connectors 236 by wires 238 contained within a casing 239, while the connectors carried by each plate 231 and 235 are connected together by a common wire 240.

As best illustrated in Fig. 3, the reciprocating movement of the cutting table B and the proper actuation of the individual cutters is controlled through the provision of nine switches 242 to 250 inclusive, carried by the supporting framework of the machine in approximately the relative positions shown in this figure. The motor start switch 242, brake release switch 243, and cutter drop switch 244 are actuated upon forward movement of operating rod 209, while the remaining switches, with the exception of the motor safety switch 250, are actuated upon movement of the cutting table. The motor safety switch is also actuated by the operating rod 209, but upon movement thereof inwardly. The motor stop switch 245 is actuated during the reverse movement of the cutting table, cutter lift switch 246 being actuated by the table when it reaches the extreme end of its cutting stroke, while the motor start switch 247, motor stop switch 248 and brake set switch 249 are actuated by the table upon forward movement thereof after the cutting of the glass sheet has been completed.

The operation of the cutting machine may be described generally as follows: Prior to the cutting operation, the cutting table B is at the extreme end of its forward movement as illustrated in Fig. 2 and all of the individual cutters are maintained in their raised or inoperative position due to the fact that the individual switches 203 are open and the electro-magnets de-energized. Of course, when the table is in its forward position, the lever arms 86 are in engagement with stop bolts 91 so that the rollers 78 are located beneath the level of the beams 75. The sheet of glass S to be cut is then laid upon the cutting section 58 of the cutting table B and after inspecting the glass, the operator closes the desired individual switches 203 by pushing the finger pieces 204 rearwardly. Inasmuch as the cutter drop switch 244 is still open, the circuit through the electro-magnets 134 is not completed and as a consequence, the mere closing of the individual switches does not effect the movement of the cutters into cutting position. After the desired individual switches have been set, however, the operator pulls the rod 209 forwardly so as to rock the shaft 208 and cause the fingers 210, 211 and 212 carried thereby (Figs. 27, 28 and 29 respectively) to substantially simultaneously close the motor start switch 242, brake release switch 243 and cutter drop switch 244 respectively. The closing of switch 242 will effect the operation of motor 125 to drive the table rearwardly, while the closing of switch 243 will serve to release the magnetic brake 129 to permit the rearward movement of said table. On the other hand, the closing of switch 244 will serve to complete the circuit through the individual switches which have been previously closed and the respective electro-magnets, causing the energization thereof and the movement of the corresponding cutters into cutting position. As illustrated, each of the switches 242, 243 and 244 preferably includes a lever arm 251 carrying at its outer end a roller 252, the said arm being normally urged upwardly to maintain the switch open so that when the said arm is pressed downwardly, the switch will be closed.

In the event the table were positively driven throughout its entire rearward and entire forward movements, it would gain such momentum that some difficulty would be encountered in reversing its direction of movement and also in bringing it to a stop at the proper time. Therefore, it is preferred that the table be positively driven throughout a portion only of its rearward movement and likewise throughout a portion only of its forward movement. To this end, after the table has been positively driven rearwardly for a relatively short distance to gain sufficient momentum, the motor 125 is stopped and the table is then permitted to coast throughout the remainder of its rearward movement and also through a portion of its forward movement. Thus, as the table moves rearwardly, the motor stop switch 245 (Fig. 32) is actuated to shut off the driving motor, such switch being opened upon engagement of the pivoted dog 253 with the roller 254 carried by lever arm 255. The dog 253 is pivoted to the forward end of the table at 256 in such a manner that it will actuate the switch upon rearward movement of the table but will ride freely over the switch during forward movement thereof.

When the table reaches the extreme end of its rearward cutting movement, the cutter lift switch 246 (Fig. 31) is adapted to be opened to break the circuit through the electromagnets 134 and thereby cause the return of the cutters into noncutting position. This is effected by the provision of a plate 257 carried at the forward end of the table and being adapted to ride up on the roller 258 carried by the lever arm 259 of switch 246. Substantially simultaneously with the opening of cutter lift switch 246, the knock-out bar 213 will be actuated in the manner above described to open the individual switches which had been previously closed.

When the table reaches the end of its rearward movement, its direction of travel is reversed and it is caused to move forwardly. When the pivoted dog 260 (Fig. 33), carried at the forward end of the table engages the roller 261 and depresses the lever arm 262 of switch 247, the said switch will be closed to again place the motor 125 in operation to positively drive the table. The dog 260 is pivoted to the table as at 263 in such a manner that while it engages and actuates the switch during the forward movement of the table, it will simply ride over the switch during the rearward movement thereof. The table is then positively driven forwardly until the pivoted dog 264 (Fig. 34), also carried at the forward end of the table, engages and depresses the roller 265 carried by lever arm 266 of switch 248, whereupon this switch will be opened to again shut off the motor so as to permit the table to coast throughout the balance of its forward movement. The dog 264 is also pivoted so that it will ride freely over the switch 248 upon rearward movement of the table.

As the table reaches the end of its forward movement, the pivoted dog 267 (Fig. 27) will engage and depress the roller 268 carried by the lever arm 269 of switch 249 to cause the setting of the magnetic brake 129 whereby to bring the table to a stop. The safety stop switch 250 (Fig. 30) is provided so that when trouble of any kind occurs, the driving motor 125 can be shut off and the magnetic brake applied. This switch is opened by moving the handle 209 inwardly to engage the roller 270 carried by lever arm 271.

After the cutting of the glass sheet has been completed and the cutters lifted therefrom, the glass is adapted to be shifted from the cutting section 58 of the table to the receiving section 59 thereof. This is automatically accomplished in the following manner, and may be best understood by reference to Figs. 10 and 18 to 23 inclusive. Thus, there is secured to the cross beam 132 a plurality of spaced brackets 272 and carried by these brackets and extending transversely of the table is a rod 273. Mounted upon the rod at spaced points longitudinally thereof are a plurality of hook members 274, each comprising a body portion 275 having a vertical slot 276 therein for receiving the rod therethrough. Carried at the rear end of the body portion is a roller 277 and extending forwardly from the body portion is a hook 278. The hook members are so constructed that the roller end 277 will overbalance the hook end 278 and will normally hold the hook upwardly in engagement with a rod 279, as shown in Fig. 10. As the glass sheet S is carried rearwardly upon the table beneath the hook members, the sheet engaging the rollers 277 will lift the same and thereby rock the said hook members upon rod 273 so as to lower the hook 278. The hook members will ride over the glass in contact therewith until the cutting table reaches the end of its rearward movement, whereupon the said members will assume the position illustrated in Fig. 23. Then, upon forward movement of the table, the hooks 278 will engage the forward edge of the glass sheets as shown in Fig. 22 and will prevent any forward movement thereof so that as the table is moved forwardly, the sheets will be slid from the cutting section 58 onto the receiving section 59. In order to facilitate this sliding movement of the sheets from one table section to the other, it will of course be remembered that when the table reaches the end of its rearward movement, the lever arms 286 will engage stop bolts 92, thereby causing a raising of the rollers 78 above the level of the beams 75, at which time the glass will be supported upon said rollers. The vertical position of the hook members 274 may be controlled by set screws 280, one being carried by each hook member and adapted to engage rod 273. The hook members are also maintained in properly spaced relation along the rod 273 by means of spacing collars or the like 281 (Fig. 18).

Also carried by the L-shaped lever 147 of each cutting unit 133 is an arm 282 pivoted to said lever as at 283 and carrying at its forward end a roller or wheel 284 of felt or some other suitable material. This roller is adapted to rest upon the upper surface of the oiling wick 112 when the table is in its normal inoperative position and when the cutters are lowered into cutting position. One of these rollers is provided for and positioned in alignment with each cutting element so that as the table is moved rearwardly through its cutting stroke, the wheels 284 will run over the glass in advance of the cutters and oil the same whereby to facilitate and better the cutting action. The downward movement of each oiling wheel is limited by a stop bolt 285 carried by cross beam 132 and engaging a small bolt 286 carried at the adjacent end of pivoted arm 282. The pivot point 283 is so positioned with respect to roller 284 that when the cutters are lowered into cutting position, the said rollers will rest upon wick 112, whereas when the cutters are raised into non-cutting position, the rollers 284 will also be raised upwardly out of contact with the oiling device as shown by the broken lines in Fig. 10. The oiling device 107 is preferably disposed slightly beneath the upper surface of the table so that the sheet will not contact therewith during the transfer thereof from the cutting section to the receiving section.

When the machine is in its normal inoperative position with the cutting table at the forward end of its movement as shown in Fig. 2, all of the individual switches 203, as well as the cutter drop switch 244, are open, while the cutter lift switch 246 is closed. The operator, after placing the sheet to be cut upon the table, closes the proper individual switches 203 by pushing the finger pieces 204 rearwardly, but because the cutter drop switch 244 is open, the circuit through the electro-magnets 134 is not completed, and as a consequence the mere closing of the individual switches does not effect movement of the cutters into cutting position. However, after the individual switches have been set, the operator grasps handle 209 to rock shaft 208, whereupon the finger 212 carried thereby (Fig. 29) will close the cutter drop switch 244 by depressing lever 140 arm thereof. Upon closing of this switch, the circuit through the electro-magnets and those individual switches which have been previously closed is completed, thereby causing the energization of the electro-magnets and the corresponding movement of the respective cutters into cutting position. The cutter drop switch 244 is adapted to be only momentarily closed so that when the operator releases handle 209, the said switch will automatically open. In order to maintain the circuit through the electro-magnets upon opening of the cutter drop switch, there is provided a holding circuit actuated upon closing of the cutter drop switch so that when this switch is again opened, the holding circuit will function to maintain the cutters in cutting position. The table is then moved rearwardly as above described and the cutters riding over the glass will serve to effect the scoring thereof. When the table reaches the end of its rearward cutting stroke, the plate 257 (Fig. 31), carried at the forward end thereof, is adapted to ride up upon the roller 258 of the cutter lift switch 246 and depress the lever arm 259 to cause the opening of said switch. The opening of the cutter lift switch 246 will break the holding circuit and thereby effect de-energization of the electromagnets whereupon the cutters will be automatically moved out of cutting position by means of the springs 198. Immediately following the breaking of the holding circuit, the knock-out bar 213 is actuated to move all of the finger pieces 204 of the individual switches previously closed forwardly to open said switches.

However, if it is desired to repeat the same cut or cuts, the rod 221 (Fig. 9) is lifted out of engagement with pin 223, and the pin inserted within slot 222ᵃ. The slot 222ᵃ is located closer to the outer end of the rod 221, as a result of which the plate 227 will not be carried rearwardly by the table a distance sufficient to engage the pin 223 and consequently the knock-out bar 213 will not be actuated upon rearward movement of the table when the pin 223 is in slot 222ᵃ. When this is done, the individual switches 203 which have been previously closed will not be opened and, when it is desired to cut the next sheet of glass, it will only be necessary for the operator to pull the handle 209 outwardly to close the cutter drop switch 244, whereupon the same cutters previously used will be moved into cutting position. In other words, it eliminates the necessity of closing the individual switches for each succeeding cutting operation when the same cut or cuts are to be repeated.

The electrical control of the cutters, it is believed, will be more clearly understood upon reference to the wiring diagram in Fig. 35. This wiring diagram includes three separate circuits, namely, an operating circuit, a holding circuit, and the magnet circuit. The main operating circuit includes the positive and negative main lines 290 and 291 respectively. Connected to the positive line 290 is a wire 292 running to a solenoid 293 and from this solenoid leads a wire 294 connected to the cutter drop switch 244. Leading from the cutter drop switch 244 to the cutter lift switch 246 is a wire 295, and connected to this wire intermediate its ends is a wire 296 running to the negative main 291. Upon closing of the cutter drop switch, the electric current will be caused to flow through wires 290 and 292 to the solenoid 293, and from this solenoid through wire 294, cutter drop switch 244, wires 295 and 296 to the negative main 291.

Associated with the solenoid 293 is a bar 297 carrying the three movable contacts 298, 299 and 300. As the current passes through the solenoid in the manner above described, it will cause the energization thereof, and this energization will cause the bar 297 to be moved to bring the contacts 298, 299 and 300 into engagement with the stationary contacts 301, 302 and 303 respectively. Upon engagement of the contacts, the holding circuit will be completed which will serve to maintain the electro-magnets 134 energized, and the respective cutters in cutting position upon opening of the cutter drop switch 244. Upon completion of the holding circuit, the current will pass from the positive main 290 through wire 292 to solenoid 293, and from the solenoid through wire 304, contacts 303 and 300, wire 305, cutter left switch 246, wires 295 and 296 to the negative main 291.

The engagement of the above-mentioned contacts will also cause the completion of the magnet circuit through the electro-magnets 134, the individual switches of which have been previously closed. Thus, the current will also pass from line 290 through contacts 298 and 301 and wire 306 leading to the connectors 236, and will pass from these connectors to the electro-magnets 134 and thence through wires 307 back to the connectors 236, passing from the connectors through wires 238 to connectors 232, and thence through the individual switches 203 back through the connectors to wire 240, and thence through contacts 302 and 299 to the negative main 291. The completion of this circuit will of course effect the energization of all of the electro-magnets, the corresponding individual switches of which have been previously closed. The energization of the electro-magnets will effect the movement of the cutters into cutting position.

When the table has reached the end of its cutting stroke, the plate 257, carried by the table (Fig. 31), serves to open the cutter lift switch 246 as above described, and upon opening of this switch, the holding circuit through the solenoid 293 will be broken whereby this solenoid will be de-energized, causing the contacts 298, 299 and 300 to become disengaged from contacts 301, 302 and 303. When this occurs, the circuit through the electro-magnets 134 will be broken, thereby causing the de-energization of the said electro-magnets and the return of the cutters to non-cutting position. When the table again moves forwardly and the plate 257 disengages the roller 258 of switch 246, the said switch will be automatically closed and will remain closed until it is again actuated upon rearward movement of the table.

The electrical control of the magnetic brake 129 and drive motor 125 will, it is believed, be more clearly understood upon reference to the wiring diagrams in Figs. 36 to 40 inclusive. The wiring diagram in Fig. 36 shows the brake actuating circuit and the brake holding circuit, the former being in full lines and the latter in broken lines where it differs from the former. In Fig. 37 is shown the brake operating circuit. The wiring diagram in Fig. 38 includes the motor actuating circuit and the motor holding circuit, the former being illustrated in full lines and the latter in broken lines where it differs from the former. In Fig. 39 is shown the motor operating circuit while in Fig. 40 is shown a composite wiring diagram of Figs. 36 to 39.

When the table is at the extreme end of its forward movement, the motor start switches 242 and 247, along with brake release switch 243 are open, while the safety switch 250, brake set switch 249, and motor stop switches 245 and 248 are closed. In the operation of the machine, after the operator has placed the glass to be cut upon the table B and has closed the desired individual switches 203, he then pulls forwardly upon the handle 209 to close, in addition to the cutter drop switch 244, the motor start switch 242 and the brake release switch 243. Upon closing of switch 150

243, the magnetic brake 129 will be released, thereby permitting the table to move rearwardly upon starting up of the motor 125 which is effected by closing of switch 242.

When the brake release switch 243 is closed, the electric current enters through the main line 310, passing through wire 311, solenoid 312, wire 313, brake release switch 243 and wire 314 to the outgoing main line 315. Inasmuch as the brake release switch 243 is only temporarily closed, and upon release of the handle 209 by the operator is again permitted to open, it is of course necessary that means be provided for maintaining the magnetic brake released when the said switch again opens. To this end, the solenoid 312 has associated therewith a bar 316 carrying the four movable contacts 317, 318, 319 and 320. Upon the passage of the electric current through the solenoid, the same becomes energized and causes the bar 316 to move in a manner to bring the contacts 317 to 320 into engagement with the stationary contacts 321, 322, 323 and 324 respectively. The engagement of contacts 320 and 324 with one another serves to complete the holding circuit, and the current is now caused to enter through the main line 310 and then pass through wire 311, solenoid 312, wire 313, into wire 325, through the brake set switch 249, wire 326, contacts 320 and 324, wires 327 and 328 and thence out through main line 315.

Simultaneous with the operation of the holding circuit, current entering through line 310 and flowing through wire 311 will pass through contacts 322 and 318 into wire 329 leading to the brake 129. The current is carried from the brake by wire 330, contacts 317 and 321, wire 328, and main line 315. Therefore, the brake will remain energized as long as the holding circuit is completed. The magnetic brake 129 is of such a construction that the passage of the electric current therethrough will effect the release thereof so that the brake will continue to remain mechanically inoperative until the current therethrough is discontinued.

Upon closing of the motor start switch 242, which is actuated substantially simultaneously with the brake release switch 243, the motor 125 is adapted to be placed in operation whereby to cause the rearward movement of the table. When the motor start switch is closed, the electric current enters through the main line 310 and passes through solenoid 331, wire 332, contacts 319 and 323, wire 333, motor start switch 242, wire 334 to wire 314, and thence out through main line 315. The solenoid 331 has associated therewith a bar 335 carrying the four movable contacts 336, 337, 338 and 339 adapted to be moved to engage the stationary contacts 340, 341, 342 and 343 respectively upon energization of the said solenoid 331. Inasmuch as the motor start switch 242 is also only temporarily closed upon movement of handle 209 by the operator, it is necessary that means be provided for maintaining the motor 125 in operation when this switch is opened. This is herein effected by the use of a holding circuit, the completion of which is achieved by the engagement of contacts 339 and 340 upon energization of solenoid 331. When the motor holding circuit is completed, the current enters through the main line 310 and then passes through solenoid 331, wire 332, contacts 319 and 323, wire 333, safety stop switch 250, motor stop switches 245 and 248, wire 344, contacts 343 and 339, wire 345, brake set switch 249, wire 326, contacts 320 and 324, wires 327 and 328, to main line 315.

Simultaneous with the operation of the motor holding circuit, current also flows through the motor 125 to effect the operation thereof, the current passing in the usual three phase manner through main lines 310, 315, 346, through contacts 340 to 342 and 336 to 338, wires 347, 348 and 349 to motor. The operation of the motor will continue until the motor holding circuit is broken.

The operation of the motor 125 will cause the table to travel rearwardly but as set forth above, it is desirable that the table be positively driven through only a portion of its rearward movement or until it has obtained sufficient momentum to carry it through the remainder of its rearward movement and also through the first small portion of its forward movement. Therefore, after the table has completed only a portion of its rearward movement, the pivoted dog 253, located at the forward end of the table (Fig. 32), opens the switch 245 by depressing the lever arm 255. When the switch 245 is thus opened, the motor holding circuit is broken, thereby de-energizing solenoid 331 and breaking the motor circuits by disengaging contacts 336 to 338 and 340 to 342 so that the table coasts rearwardly throughout the remainder of its rearward stroke and also through a portion of its forward stroke. Just as soon as the pivoted dog 253 passes switch 245, the said switch again automatically closes, but the closing theref will not again start up the operation of the motor due to the de-energization of the solenoid 331 and the breaking of the holding circuit.

After the table has completed its rearward movement and has started forwardly, the motor start switch 247 (Fig. 33) is closed by means of the pivoted dog 260 at the forward end of the table. The closing of this switch will again energize solenoid 331, thereby engaging contacts 336 to 339 with contacts 340 to 343, which will again actuate the motor holding circuit and the motor operating circuits so that the table will be positively driven forwardly, the current flowing through the circuits in the same manner described above. Upon closing of the switch 247, the path of travel of the current is through the main line 310, solenoid 331, wire 332, contacts 319 and 323, wires 333 and 350, motor start switch 247, wires 351, 334 and 314 out through main line 315.

It is also preferred to again shut off the current to the motor 125 before the table completes its entire forward movement, and this is effected by means of the pivoted dog 264 (Fig. 34), opening motor stop switch 248. When the switch 248 is opened, the circuit through the solenoid 331 is broken, thereby again disengaging the contacts 336 to 339 and 340 to 343 in the holding and motor operating circuits, thus discontinuing operation of the motor 125. When the table reaches the end of its forward movement, the pivoted dog 264 (Fig. 27), carried at the forward end of the table, opens switch 249 which will cause the de-energization of solenoid 312, thereby disengaging contacts 317 to 320 and 321 to 324 inclusive in the brake holding and brake operating circuits, causing the setting of the brake which stops the table.

It is to be understood that the form of the invention herewith shown and described is to be taken as the preferred embodiment of the same, and that various changes in the shape, size and arrangement of parts may be resorted to without departing from the spirit of the invention or the scope of the subjoined claims.

I claim:

1. In a machine for cutting glass sheets or other sheet material, a table for supporting the sheet to be cut, a plurality of cutters mounted above the table and independently movable at all times into and out of cutting position, means for causing relative movement between said table and cutters, a plurality of electro-magnets, one being associated with each cutter, a plurality of individual switches, one switch being provided for each cutter and connected in series with its respective electromagnet, a control device connected in series with said individual switches, and means under the control of an operator for actuating said control device to effect the completion of a circuit through those individual switches which may have been previously closed and the respective electro-magnets whereby to cause movement of the corresponding cutters into cutting position.

2. In a machine for cutting glass sheets or other sheet material, a table for supporting the sheet to be cut, a plurality of cutters mounted above the table and independently movable at all times into and out of cutting position, means for causing relative movement between said table and cutters, a plurality of electro-magnets, one being associated with each cutter, a plurality of individual switches, one switch being provided for each cutter and connected in series with its respective electro-magnet, a control device connected in series with said individual switches, means under the control of an operator for actuating said control device to effect the completion of a circuit through those individual switches which may have been previously closed and the respective electro-magnets whereby to cause movement of the corresponding cutters into cutting position, and means operable automatically when the table reaches a predetermined position for breaking the circuit through those electro-magnets which had been previously energized.

3. In a machine for cutting glass sheets or other sheet material, a table for supporting the sheet to be cut, a plurality of cutters mounted above the table and independently movable at all times into and out of cutting position, means for causing relative movement between said table and cutters, a plurality of electro-magnets, one being associated with each cutter, a plurality of individual switches, one switch being provided for each cutter and connected in series with its respective electromagnet, a control device connected in series with said individual switches, means under the control of an operator for actuating said control device to effect the completion of a circuit through those individual switches which may have been previously closed and the respective electro-magnets whereby to cause movement of the corresponding cutters into cutting position, means connected in series with said control device and operable when the table reaches a predetermined position for breaking the circuit through those electro-magnets which had been previously energized, and means actuated by the table for opening all of the individual switches which had been previously closed.

4. In a machine for cutting glass sheets or other sheet material, a table for supporting the sheet to be cut, a plurality of cutters mounted above the table and independently movable at all times into and out of cutting position, means for movably supporting the table, means for reciprocating said table beneath the cutters including a motor, a control device connected in series with said motor, a plurality of electro-magnets, one being associated with each cutter, a plurality of individual switches, one switch being provided for each cutter and connected in series with its respective electro-magnet, a control device connected in series with the individual switches, and means under the control of an operator for substantially simultaneously actuating said control devices to effect the completion of a circuit through the motor to drive the table and also the completion of a circuit through those individual switches which may have been previously closed and the respective electro-magnets whereby to cause movement of the corresponding cutters into cutting position.

5. In a machine for cutting glass sheets or other sheet material, a table for supporting the sheet to be cut, a plurality of cutters mounted above the table and independently movable at all times into and out of cutting position, means for movably supporting the table, means for reciprocating said table beneath the cutters including a motor, a control device connected in series with said motor, a magnetic brake operable to prevent movement of the table, a control device connected in series with said brake, a plurality of electro-magnets, one being associated with each cutter, a plurality of individual switches, one switch being provided for each cutter and connected in series with its respective electro-magnet, a control device connected in series with the individual switches, and means under the control of an operator for substantially simultaneously actuating said control devices to effect the completion of a circuit through the motor to drive the table; the completion of a circuit through the brake to release the same to permit movement of said table, and also the completion of a circuit through those individual switches which may have been previously closed and the respective electro-magnets whereby to cause movement of the corresponding cutters into cutting position.

6. In a machine for cutting glass sheets or other sheet material, a table for supporting the sheet to be cut, a plurality of cutters mounted above the table and independently movable at all times into and out of cutting position, means for reciprocating said table beneath said cutters, an electro-magnet for controlling each cutter, a plurality of switches for individually and selectively closing the circuit through said electro-magnets to move the corresponding cutters into cutting position, and means for simultaneously opening all of the switches which have been previously closed, including a knock-out bar, means for pivotally mounting said bar, a pivotally mounted lever arm located in back of said knock-out bar, and means actuated upon movement of the table for swinging said lever arm about its pivot to move the knock-out bar forwardly to open said switches.

7. In a machine for cutting glass sheets or other sheet material, a table for supporting the sheet to be cut including a cutting section and a receiving section, a series of rollers carried by said receiving section, means for mounting said rollers in a fixed horizontal position, a series of rollers carried by said cutting section, means for mounting said second series of rollers for vertical movement, said second-mentioned series of rollers being disposed beneath the level of the first-mentioned rollers during the cutting operation, and means for raising the movable rollers bodily into horizontal alignment with the fixed rollers after the cutting has been completed whereby to facilitate the transfer of the glass from the cutting section onto the receiving section.

8. In a machine for cutting glass sheets or other sheet material, a table for supporting the sheet to be cut including a cutting section and a receiving section, means for reciprocating said table, a series of rollers carried by said receiving section, means for mounting said rollers in a fixed horizontal position, a series of rollers carried by said cutting section, means for mounting said second series of rollers for vertical movement, said second-mentioned series of rollers being disposed beneath the level of the first-mentioned rollers during the cutting operation, and means actuated upon movement of the table in one direction for raising the movable rollers bodily into horizontal alignment with the fixed rollers after the cutting has been completed whereby to facilitate the transfer of the glass from the cutting section onto the receiving section.

9. In a machine for cutting glass sheets or other sheet material, a table for supporting the sheet to be cut including a cutting section and a receiving section, means for reciprocating said table, a series of rollers carried by said receiving section and maintained in a fixed horizontal position, a series of rollers carried by said cutting section and mounted for vertical movement, said second-mentioned rollers being disposed beneath the level of the first-mentioned rollers during the cutting operation, means actuated upon movement of the table in one direction for raising the movable rollers into horizontal alignment with the fixed rollers after the cutting has been completed whereby to facilitate the transfer of the glass from the cutting section onto the receiving section, means for maintaining the movable rollers in raised position, and means actuated upon movement of the table in a reverse direction for lowering said rollers.

10. In a machine for cutting glass sheets or other sheet material, a table for supporting the sheet to be cut including a cutting section and a receiving section, means for reciprocating said table, a series of rollers carried by said receiving section and maintained in a fixed horizontal position, a series of rollers carried by said cutting section and mounted for vertical movement, said second-mentioned rollers being disposed beneath the level of the first-mentioned rollers during the cutting operation, means actuated upon movement of the table in one direction for raising the movable rollers into horizontal alignment with the fixed rollers, and means effective for transferring the cut glass from the rollers of the cutting section onto the rollers of the receiving section upon movement of the table in a reverse direction.

11. In a machine for cutting glass sheets or other sheet material, a table for supporting the sheet to be cut including a cutting section and a receiving section, means for reciprocating said table, a series of rollers carried by said receiving section and maintained in a fixed horizontal position, a series of rollers carried by said cutting section and mounted for vertical movement, said second-mentioned rollers being disposed beneath the level of the first-mentioned rollers during the cutting operation, means actuated upon movement of the table in one direction for raising the movable rollers into horizontal alignment with the fixed rollers, a plurality of hook members effective for transferring the cut glass from the rollers of the cutting section onto the rollers of the receiving section upon movement of the table in a reverse direction, and means for mounting said hook members to cause bodily vertical and rocking movement thereof.

12. In a machine for cutting glass sheets or other sheet material, a table for supporting the sheet to be cut, a plurality of cutters mounted above the table and independently movable at all times into and out of cutting position, means for controlling the operation of said cutters, means for movably supporting the table, means for reciprocating said table beneath the cutters including a motor, a control device connected in series with said motor, means under the control of an operator for actuating said control device to effect the completion of a circuit through the motor to drive the table, means operated by the table when it reaches a predetermined position in its rearward movement for breaking the circuit through said motor, means operated by the table during its forward movement to again complete the circuit through the motor, and means also operated by the table upon continued forward movement thereof for again breaking the circuit through said motor.

13. In a machine for cutting glass sheets or other sheet material, a table for supporting the sheet to be cut, a plurality of cutters mounted above the table and independently movable at all times into and out of cutting position, means for controlling the operation of said cutters, means for movably supporting the table, means for reciprocating said table beneath the cutters including a motor, a control device connected in series with said motor, a magnetic brake operable to prevent movement of the table, a control device connected in series with said brake, means under the control of an operator for substantially simultaneously actuating said control devices to effect the completion of a circuit through the motor to drive the table and also the completion of a circuit through the brake to release the same to permit movement of said table, means operated by the table when it reaches a predetermined position for breaking the circuit through the motor, and means also operated by the table when it reaches a predetermined position to cause the setting of said brake to bring the table to a stop.

14. In a machine for cutting glass sheets or other sheet material, a table for supporting the sheet to be cut, a plurality of cutters mounted above the table and independently movable at all times into and out of cutting position, means for controlling the operation of said cutters, means for movably supporting the table, means for reciprocating said table beneath the cutters including a motor, a control device connected in series with said motor, a magnetic brake operable to prevent movement of the table, a control device connected in series with said brake, means under the control of an operator for substantially simultaneously actuating said control devices to effect the completion of a circuit through the motor to drive the table and also the completion of a circuit through the brake to release the same to permit movement of said table, means operated by the table when it reaches a predetermined position in its rearward movement for breaking the circuit through said motor, means operated by the table during its forward movement to again complete the circuit through the motor, means also operated by the table upon continued forward movement thereof for again breaking the circuit through said motor, and means operated by the table when it reaches a predetermined position to cause the setting of said brake to bring the table to a stop.

15. In a machine for cutting glass sheets or other sheet material, a table for supporting the sheet to be cut, a plurality of cutters mounted above the table and independently movable at all times into and out of cutting position, means for movably supporting the table, means for reciprocating said table beneath the cutters including a motor, a control device connected in series with said motor, a plurality of electro-magnets, one being associated with each cutter, a plurality of individual switches, one switch being provided for each cutter and connected in series with its respective electro-magnet, a control device connected in series with the individual switches, means under the control of an operator for substantially simultaneously actuating said control devices to effect the completion of a circuit through the motor to drive the table and also the completion of a circuit through those individual switches which may have been previously closed and the respective electro-magnets whereby to cause movement of the corresponding cutters into cutting position, means operated by the table when it reaches a predetermined position for breaking the circuit through said motor, and means also operated by the table when it reaches a predetermined position for breaking the circuit through those electro-magnets which had been previously energized.

16. In a machine for cutting glass sheets or other sheet material, a table for supporting the sheet to be cut, a plurality of cutters mounted above the table and independently movable at all times into and out of cutting position, means for movably supporting the table, means for reciprocating said table beneath the cutters including a motor, a control device connected in series with said motor, a plurality of electro-magnets, one being associated with each cutter, a plurality of individual switches, one switch being provided for each cutter and connected in series with its respective electro-magnet, a control device connected in series with the individual switches, means under the control of an operator for substantially simultaneously actuating said control devices to effect the completion of a circuit through the motor to drive the table and also the completion of a circuit through those individual switches which may have been previously closed and the respective electro-magnets whereby to cause movement of the corresponding cutters into cutting position, means connected in series with the motor control device and operated by the table when it reaches a predetermined position for bearking the circuit through said motor, means connected in series with the cutter control device and also operated by the table when it reaches a predetermined position for breaking the circuit through those electro-magnets which had been previously energized, and means also operated by the table for opening all of the individual switches which had been previously closed.

17. In a machine for cutting glass sheets or other sheet material, a table for supporting the sheet to be cut, a plurality of cutters mounted above the table and independently movable at all times into and out of cutting position, means for movably supporting the table, means for reciprocating said table beneath the cutters including a motor, a control device connected in series with said motor, a magnetic brake operable to prevent movement of the table, a control device connected in series with said brake, a plurality of electro-magnets, one being associated with each cutter, a plurality of individual switches, one switch being provided for each cutter and connected in series with its respective electro-magnet, a control device connected in series with the individual switches, means under the control of an operation for substantially simultaneously actuating said control devices to effect the completion of a circuit through the motor to drive the table; the completion of a circuit through the brake to release the same to permit movement of said table, and also the completion of a circuit through those individual switches which may have been previously closed and the respective electro-magnets whereby to cause movement of the corresponding cutters into cutting position, means operated by the table when it reaches a predetermined position for breaking the circuit through those electro-magnets which had been previously energized, means also operated by the table after the completion of the cutting operation for breaking the circuit through the motor, and means operated by the table when it reaches a predetermined position to cause the setting of said brake to bring the table to a stop.

18. In a machine for cutting glass sheets or other sheet material, a table for supporting the sheet to be cut, a plurality of cutters mounted above the table and independently movable at all times into and out of cutting position, means for reciprocating said table beneath said cutters, an electro-magnet for controlling each cutter, a plurality of switches for individually and selectively closing the circuit through said electro-magnets to move the corresponding cutters into cutting position, and means for simultaneously opening all of the switches which have been previously closed, including a knock-out bar, means for pivotally mounting said bar, a pivotally mounted lever arm located in back of said knock-out bar, and means for swinging said lever arm about its pivot to move the knock-out bar forwardly to open said switches.

19. In a machine for cutting glass sheets or other sheet material, a table for supporting the sheet to be cut, a plurality of cutters mounted above the table and independently movable at all times into and out of cutting position, means for reciprocating said table beneath said cutters, an electro-magnet for controlling each cutter, a plurality of switches for individually and selectively closing the circuit through said electro-magnets to move the corresponding cutters into cutting position, and means for simultaneously opening all of the switches which have been previously closed, including a knock-out bar, means for pivotally mounting said bar, a pivotally mounted lever arm located in back of said knock-out bar, an elongated member pivoted to said lever arm and extending longitudinally of the table, said member being engageable by said table upon rearward movement thereof to swing said lever arm about its pivot to move the knock-out bar forwardly to open said switches, and means for limiting the forward movement of said knock-out bar.

20. In a machine for cutting glass sheets or other sheet material, a reciprocating table for supporting the sheet to be cut and including horizonally spaced cutting and receiving sections, means for reciprocating said table, a stationary cross member extending transversely above the table, a plurality of cutting units carried by said cross member and each including a cutting element for cutting the glass upon rearward movement of said table, an oiling device carried upon the top of the table and positioned between the cutting and receiving sections thereof, and a freely rotatable oiling wheel carried by each cutting unit and adapted to engage and receive oil from said oiling device, said wheels being caused to run over the glass in advance of the respective cutting elements as the table is moved rearwardly to oil the glass whereby to facilitate the cutting action of the said cutting elements.

21. In a machine for cutting glass sheets or other sheet material, a reciprocating table for supporting the sheet to be cut and including horizontally spaced cutting and receiving sections, means for reciprocating said table, a stationary cross member extending transversely above the table, a plurality of cutting units carried by said cross member and each including a pivotally mounted substantially L-shaped lever, a cutting element carried at one end of the lever for cutting the glass upon rearward movement of said table, means associated with the opposite end of said lever for effecting pivotal movement thereof to move the cutting element into and out of cutting position, an oiling device carried upon the top of the table and positioned between the cutting and receiving sections thereof, an arm pivoted to each lever, a freely rotatable oiling wheel carried at the outer end of said arm and adapted to engage and receive oil from said oiling device, said wheels being caused to run over the glass in advance of the respective cutting elements as the table is moved rearwardly to oil the glass whereby to facilitate the cutting action of the said cutting elements, and means carried by said cross member and engaging said arms so that upon pivotal movement of the levers to move the cutting elements out of cutting position, the oiling wheels will be moved out of engagement with said oiling device.

EDWIN A. ROSIN.